(12) United States Patent
Kang

(10) Patent No.: US 9,930,944 B2
(45) Date of Patent: Apr. 3, 2018

(54) CASE, ELECTRONIC DEVICE COUPLED TO CASE, AND METHOD OF CONTROLLING ELECTRONIC DEVICE

(71) Applicant: Samsung Electronics Co., Ltd., Gyeonggi-do (KR)

(72) Inventor: Il Dong Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 135 days.

(21) Appl. No.: 15/150,769

(22) Filed: May 10, 2016

(65) Prior Publication Data

US 2016/0349885 A1    Dec. 1, 2016

(30) Foreign Application Priority Data

May 28, 2015   (KR) .......................... 10-2015-0075273

(51) Int. Cl.
*A45C 11/00* (2006.01)
*G06F 1/16* (2006.01)

(52) U.S. Cl.
CPC ............ *A45C 11/00* (2013.01); *G06F 1/1677* (2013.01); *A45C 2011/001* (2013.01); *A45C 2011/002* (2013.01); *A45C 2011/003* (2013.01); *A45C 2200/15* (2013.01); *G06F 2200/1634* (2013.01)

(58) Field of Classification Search
CPC .............. A45C 11/00; A45C 2011/002; A45C 2011/001; A45C 2011/003; A45C 2200/15; G06F 1/1677; G06F 2200/1634
See application file for complete search history.

(56) References Cited

U.S. PATENT DOCUMENTS

| | | | |
|---|---|---|---|
| 8,143,983 B1 | 3/2012 | Lauder et al. | |
| 8,390,412 B2 | 3/2013 | Lauder et al. | |
| 8,395,465 B2 | 3/2013 | Lauder et al. | |
| 8,648,679 B2 | 2/2014 | Lauder et al. | |
| 8,928,437 B2 | 6/2015 | Lauder et al. | |
| 2012/0069502 A1 | 3/2012 | Lauder et al. | |
| 2012/0069503 A1 | 3/2012 | Lauder et al. | |
| 2012/0069540 A1 | 3/2012 | Lauder et al. | |
| 2013/0081962 A1* | 4/2013 | Cohen .................. | H05K 5/0204 206/223 |
| 2013/0162668 A1 | 6/2013 | Lauder et al. | |
| 2013/0162669 A1 | 6/2013 | Lauder et al. | |

* cited by examiner

*Primary Examiner* — Charles Hicks
(74) *Attorney, Agent, or Firm* — Cha & Reiter, LLC

(57) ABSTRACT

A case for an electronic device including a coupling member detachably coupled to at least a part of the electronic device. A cover, which has one or more folded positions ranging between an opened state and a closed state, the cover extends from the coupling member in a to cover a display of the electronic device, and at least one Force Sensing Resistor (FSR) sensor disposed in the cover to generate an interrupt based on a pressure applied thereto. The at least one FSR sensor includes one or more inner FSR sensors disposed on an inner surface of the cover, and one or more outer FSR sensors disposed on an outer surface of the cover.

20 Claims, 15 Drawing Sheets

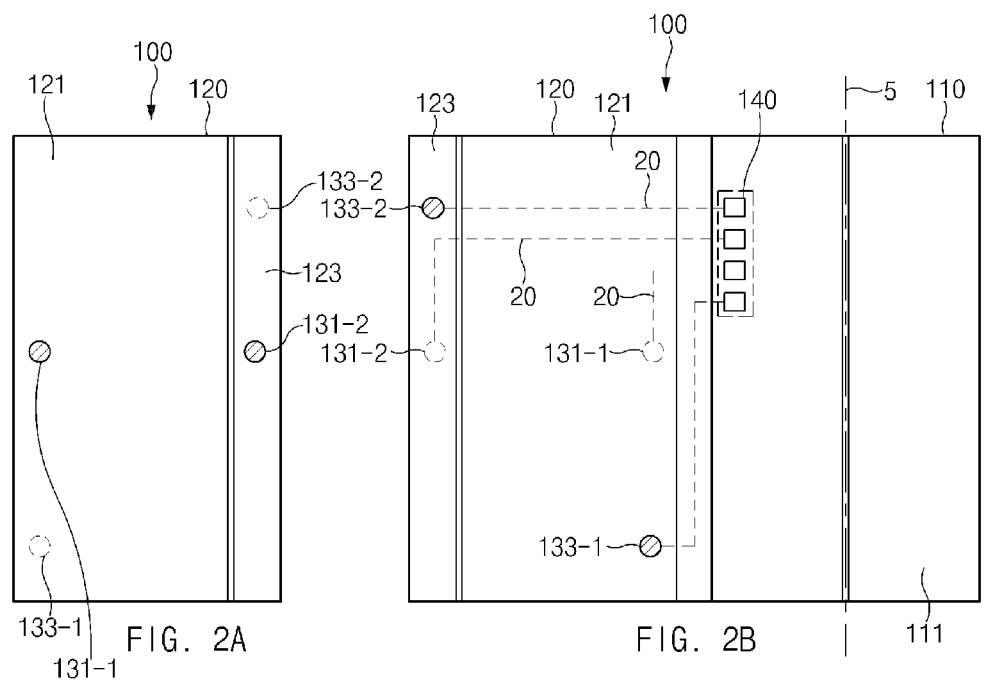
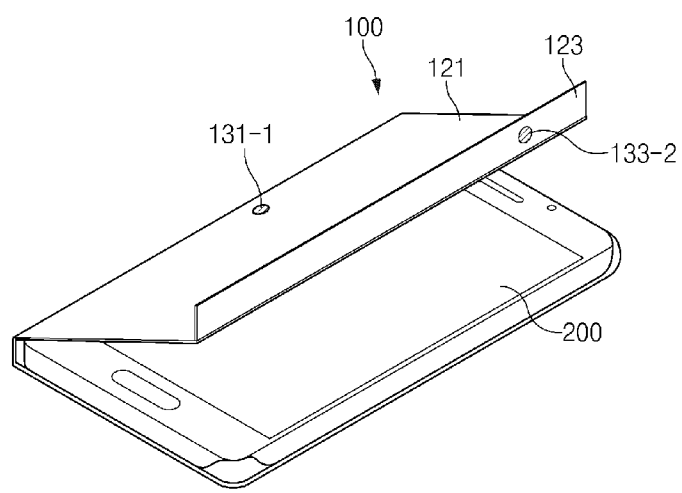

CASE, ELECTRONIC DEVICE COUPLED TO CASE, AND METHOD OF CONTROLLING ELECTRONIC DEVICE

CLAIM OF PRIORITY

This application claims the benefit under 35 U.S.C. § 119(a) of a Korean patent application filed on May 28, 2015 in the Korean Intellectual Property Office and assigned Serial number 10-2015-0075273, the entire disclosure of which is hereby incorporated by reference.

BACKGROUND

Field of the Disclosure

The present disclosure relates to a case including a cover, an electronic device coupled to the case, and a method of controlling the electronic device.

Description of the Related Art

Due to the development of the electronic technologies, many varied types of electronic products are now available. In particular, in recent years, the popularity of the portable electronic devices such as smartphones and tablet PCs has been expanded.

The portable electronic devices are frequently used while often at least partially-housed in cases for protection from impacts that are associated with portability. In particular, many of the portable electronic devices have cases that include a cover for covering a touch display, as the display is highly vulnerable to impacts.

In general, high-priced sensors such as a Hall sensor or a proximity sensor are often used with such portable devices for the device to determine an opening/closing state of the cover. However, there is a limit in using the high-priced sensors in the case of a low-priced popular electronic device. Further, when the Hall sensor is employed, the weight of the case may increase because a magnet is attached to the cover to sense an opening/closing state of the cover, and the weight of the electronic device may increase and the spatial utility thereof may be limited due to a shielding steel plate is attached to the electronic device to protect components, such as a geomagnetic sensor, which are influenced by magnetic forces. Therefore, a need exists to provide a way for a device to determine the opening/closing state of its copier unknown heretofore.

SUMMARY

Aspects of the present disclosure are to address at least some of the above-mentioned problems and/or disadvantages and to provide at least some of the advantages described below. Accordingly, an aspect of the present disclosure provides an electronic device that performs an operation based on an opening/closing state of a cover by sensing the opening/closing state without using high-priced sensors in an environment in which the high-priced sensors cannot be used, and a method of controlling the electronic device.

In accordance with an aspect of the present disclosure, there is provided a case for an electronic device, the case including a coupling member detachably coupled to a part of the electronic device, a cover extending from the coupling member in a foldable fashion to cover a display of the electronic device, and at least one Force Sensing Resistor (FSR) sensor disposed in the cover to generate an interrupt based on a pressure applied thereto, wherein the at least one FSR sensor includes one or more inner FSR sensors disposed on an inner surface of the cover, and one or more outer FSR sensors disposed on an outer surface of the cover.

In accordance with another aspect of the present disclosure, there is provided an electronic device coupled to a case including a cover configured to cover a display, the electronic device including a display, an interface that receives interrupts from one or more inner Force Sensing Resistor (FSR) sensors disposed on an inner surface of the cover and one or more outer FSR sensors disposed on an outer surface of the cover, and a processor configured to perform a predefined operation based on whether the interrupts of the inner FSR sensors and the outer FSR sensors are received by the interface.

In accordance with another aspect of the present disclosure, there is provided a method of controlling an electronic device coupled to a case including a cover configured to cover a display, the method including, determining whether interrupts from one or more inner Force Sensing Resistor (FSR) sensors disposed on an inner surface of the cover and one or more outer FSR sensors disposed on an outer surface of the cover are received, and performing a predefined operation based on whether the interrupts from the inner FSR sensors and the outer FSR sensors are received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A. FIG. 2B and FIG. 2C are block diagrams illustrating a structure of a case according to various embodiments of the present disclosure;

Throughout the drawings, it should be noted that like reference numbers are used to depict the same or similar elements, features, and structures.

DETAILED DESCRIPTION

Figures 1A, 1B:
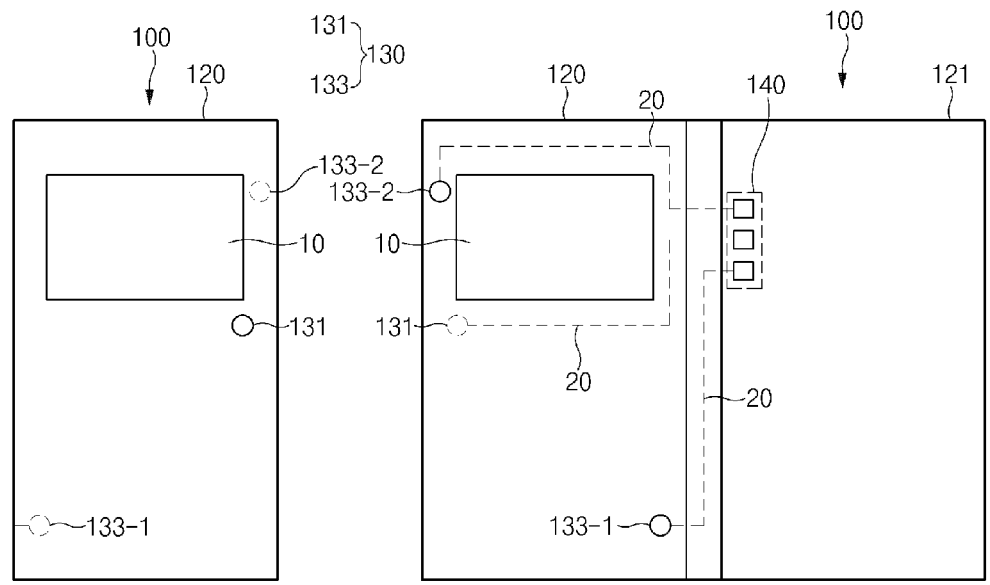
FIG. 1A, FIG. 1B and FIG. 1C are block diagrams illustrating a structure of a case according to an embodiment of the present disclosure.

Hereinafter, various embodiments of the present disclosure will be described with reference to the accompanying drawings. Accordingly, those of ordinary skill in the art will recognize that modification, equivalent, and/or alternative expression of the various embodiments described herein can be made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing from the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" is not limited to mean only "specifically designed to" in hardware. Instead, the expression, for example, a "processor configured to (or set to) perform A, B, and C" may mean a dedicated processor (for example, an embedded processor) for performing a corresponding operation or a generic- purpose processor (for example, a central processing unit (CPU) or an application processor including integrated circuitry) which may perform corresponding operations by executing one or more software programs which are stored in a non-transitory memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio player, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google™), a game console (for example, Xbox™ or PlayStation™), an electronic dictionary, an electronic key, a camcorder, or an electronic panel, just to name some non-limiting possibilities.

In another embodiment of the present disclosure, the electronic device may include one or more various types of medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller machine (ATM), a point of sales (POS) of a store, or an Internet of Things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may comprise a flexible electronic device, and/or may have flexible display. Further, the electronic device according to an embodiment of the present disclosure is not limited to the aforementioned devices, but may include new electronic devices produced due to the development of technologies.

Hereinafter, an electronic device according to the present disclosure includes a connector according to various embodiments that will now be described with reference to the accompanying drawings. The term "user" used herein may refer to a person who uses an electronic device or may refer, for example to a device (for example, an artificially intelligent electronic device) that uses an electronic device.

FIG. 1 is a block diagram illustrating a structure of a case according to an embodiment of the present disclosure.

Figure 1C:
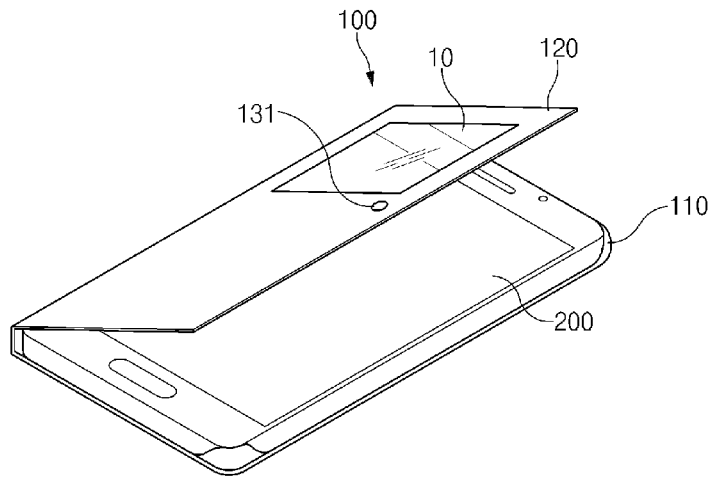

FIG. 1 illustrates a structure in which a cover 120 has a transparent window 10. FIG. 1A is a front view illustrating a state in which the cover 120 of case 100 is closed, and FIG. 1B is a front view illustrating a state in which the cover 120 of the case 100 is opened. The cover 120 is foldable between the open and closed states. FIG. 1C is a perspective view illustrating an electronic device 100 in a state in which the electronic device 100 is coupled to the case 100.

Referring now to FIG. 1, the case 100 may include a coupling member 110, a cover 120, a Force Sensing Resistor (FSR) sensor 130 (e.g., outer FSR sensor 131 and inner FSR sensor 133), and an interface 140. According to an embodiment, the case 100 may be coupled to an electronic device by the coupling member 110. The coupling member 110 may be detachably mounted on at least a portion of the electronic device 200. According to an embodiment, the coupling member 110 may be attached to at least a portion of the rear surface (or an opposite surface of a display surface) and side surfaces of the electronic device.

The cover 120 may shield the display surface (or the front surface) of the electronic device 200 to protect the electronic device. According to an embodiment, the cover 120 may extend from the coupling part 110 in a foldable fashion to cover a display of the electronic device. The cover 120 may cover the display of the electronic device 200 in a closed state.

According to an embodiment of the disclosure, the cover 120 may include a transparent window 10 formed in at least part of an area of the cover 120. The user of the electronic device 200 may identify information (or contents) that is displayed through the transparent window 10 while the case 100 is coupled to the electronic device 200.

The FSR sensor 130 may output an interrupt or a resistance value by sensing a pressure. According to an embodiment of the disclosure, the FSR sensor 130 may generate an interrupt if a predefined pressure (or weight) or higher is applied thereto. The predefined pressure, for example, may be set to be smaller than the weight of the cover 120. According to an embodiment, if a pressure (or weight) is applied to the FSR sensor 130, the FSR sensor 130 may output a resistance value corresponding to the applied pressure. According to an embodiment of the disclosure, the FSR sensor 130 may transfer an interrupt or a resistance value to an interface 140 through a signal line 20. According to an embodiment of the disclosure, the case 100 may include signal lines 20 corresponding to the number of FSR sensors. According to an embodiment, the signal line 20 may be disposed in the interior of the cover 120 (that is, between the outer surface and the inner surface of the cover 120) so as not to be exposed to the outside.

According to an embodiment of the disclosure, the FSR sensor 130 may include at least one outer FSR sensor 131 and at least one inner FSR sensor 133. According to an embodiment, the outer FSR sensor 131 may be disposed on an inner surface of the cover 120 (a surface that is exposed to the outside while the cover 120 is opened) to sense a pressure applied to the outer surface of the cover 120. According to an embodiment of the disclosure, the inner FSR sensor 133 may be disposed on an inner surface of the cover 120 (a surface that is opposite to the display surface of the electronic device 200 while the cover 120 is closed) to sense a pressure applied to the inner surface of the cover 120.

According to an embodiment of the disclosure, when the FSR sensor 130 includes a plurality of outer FSR sensors 131 or a plurality of inner FSR sensors 133, the plurality of outer FSR sensors 131 or the plurality of inner FSR sensors 133 may be disposed in different locations with reference to the transverse axis of the cover 120 (or on the transverse axis of the cover 120). For example, referring to FIG. 1B, the first inner FSR sensor 133-1 is situated on the left side of the inner surface of the cover 120, and the second inner FSR sensor 133-2 is situated on the right side of the inner surface of the cover 120.

According to an embodiment of the disclosure, the FSR sensor 130 may include an FSR element and an interrupt generating module. According to an embodiment, the FSR element may be constructed of a polymer in the form of a film. The film, which may be a sensing film in which electrically conducting and non-conducting particles are suspended in a matrix, in which pressing (e,g, force) will change the resistance of the film by changing the quantity of particles contacting conductors in an active area aligned with the film.

The resistance value of the FSR element may decrease as a pressure (or force) applied to a surface of the FSR element increases. The interrupt generating module is electrically connected to the FSR element to generate an interrupt based on a resistance value of the FSR element. For example, if the resistance value of the FSR element is a predefined value or less (that is, a predefined pressure or higher is applied to the FSR element), the interrupt generating module may generate an interrupt. It is also within the spirit of the disclosure that the predefined values may be a range of values. According to an embodiment, the interrupt generating module may include a comparator circuit configured to generate an interrupt if the resistance value of the FST element is a predefined value or less. The FSR sensor 130 including the FSR element and the interrupt generating module will be described with reference to FIG. 4 in the following.

According to an embodiment, the interrupt generating module may be included in the electronic device 200. For example, the FSR sensor 130 may include only an FSR element without any interrupt generating module. For example, the FSR sensor 130 may output a resistance value of the FSR element. The FSR sensor 130 having only an FSR element will be described with reference to FIG. 6 in the following.

The interface 140 may transmit an interrupt or a resistance value that is received from the FSR sensor 130 to the electronic device 200. According to an embodiment, the interface 140 may be disposed on the inner surface of the coupling member 110 (that is, a surface that faces the electronic device 200). According to an embodiment, the interface 140 may make direct contact with an interface 220 (see FIG. 3) included in the electronic device 200 while being coupled to the electronic device 200. According to an embodiment, the interface 140 may have contact points corresponding to the number of the FSR sensors 130.

Although it is described in the embodiment of FIG. 1 that the case 100 includes one outer FSR sensor 131 and two inner FSR sensors 133-1 and 133-2, the case may include at least one outer FSR sensor 131 (for example, two outer FSR sensors) and at least one inner FSR sensor 133 (for example, three inner FSR sensors).

FIG. 2 is a block diagram illustrating a structure of a case according to various embodiments of the present disclosure.

FIG. 2 illustrates a structure of the case 100 in which the cover 120 includes a plurality of foldable areas. FIG. 2A is a front view illustrating a state in which the cover 120 of a case 100 is closed, and FIG. 2B is a front view illustrating a state in which the cover 120 of the case 100 is opened. FIG. 2C is a perspective view illustrating an electronic device 100 in a state in which the electronic device 100 is coupled to the case 100. In FIG. 2, a difference from the case of FIG. 1 will be mainly described.

Referring now to FIG. 2, the case 100 may include a coupling member 110, a cover 120, a Force Sensing Resistor (FSR) sensor 130, and an interface 140.

According to an embodiment of the disclosure, a part of the coupling member 110 may be foldable about a longitudinal axis of the coupling member 110. For example, referring to FIG. 2B, an area 111 of the coupling member 110 may be foldable about the longitudinal axis 5.

According to an embodiment of the disclosure, the cover 120 may include a plurality of areas 121 and 123 that are foldable about longitudinal axes of the cover 120. For example, the first area 121 may be rotated about a border with the coupling member 110, and the second area 123 may be rotated about a border with the first area 121. According to an embodiment, at least one outer FSR sensor 131 may be disposed in each of the plurality of areas 121 and 123. For example, a first outer FSR sensor 131-1 may be disposed in the first area 121, and a second outer FSR sensor 131-2 may be disposed in the second area 123. According to an embodiment, at least one inner FSR sensor 133 may be disposed in each of the plurality of areas 121 and 123. For example, referring to FIG. 2B, a first inner FSR sensor 133-1 may be disposed in the first area 121, and a second inner FSR sensor 133-2 may be disposed in the second area 123.

Although it is shown in the embodiment of FIG. 2 that the case 100 includes two outer FSR sensors 131-1 and 131-2 and two inner FSR sensors 133-1 and 133-2, the case may include at least one outer FSR sensor 131 (for example, one outer FSR sensor) and at least one inner FSR sensor 133 (for example, three inner FSR sensors).

Figure 3:
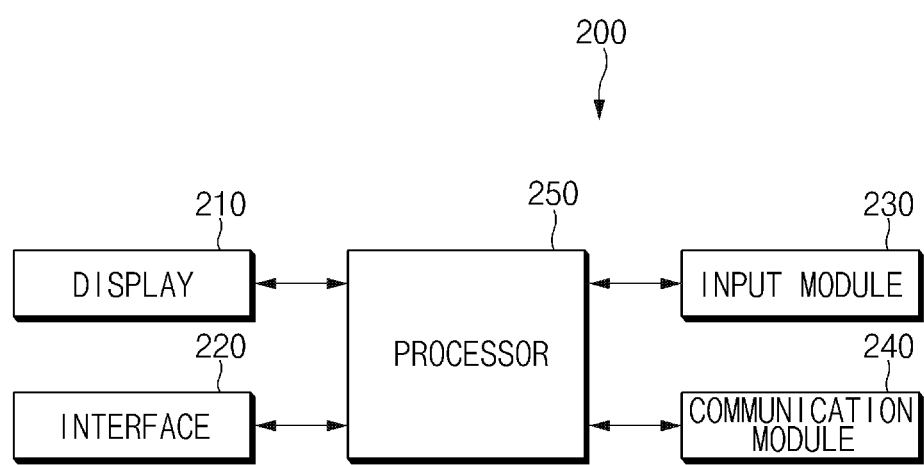
FIG. 3 is a block diagram of an electronic device according to an embodiment of the present disclosure.

FIG. 3 is a block diagram of an electronic device according to an embodiment of the present disclosure.

Referring now to FIG. 3, the electronic device 200 may include a display 210, an interface 220, an input module 230, a communication module 240, and at least one processor 250.

According to an embodiment, the display 210 may display a display screen including contents or a user interface. For example, the display 210 may display a main screen, an application execution screen, and a locking screen.

The interface 220 may receive an interrupt from the case 100. The interface 220 may transfer an interrupt received from the case 100 to the processor 250. The interface 220 may make direct contact with the interface 140 of the case 100 while the electronic device 100 is coupled to the case 100. According to an embodiment, the interface 220 may have contact points corresponding to the number of the FSR sensors 130 of the case 100.

An input module 230 may receive a user input. According to an embodiment, the input module 230 may include a touch sensor panel that senses a touch input of the user and a pen sensor panel that senses a pen input of the user. According to an embodiment, the input module 230 may sense a user input that is input within a specific distance (e.g. near-touch), while the user input is not directly in contact with the panel as well as when the user input makes direct contact with the panel (for example, the touch sensor panel or the pen sensor panel). For example, the input module 230 may sense a user input that is input through the transparent window 10 of the cover 120 while the electronic device 200 is coupled to the case 100 and the cover 120 is closed.

The communication module 240 may be connected to a network to communicate with an external device (for example, a server, a base station, or an external electronic device). According to an embodiment, the communication module 240 may be connected to an external device through the Internet network or a communication network. The communication module 240 may transmit and receive a call, a message, or data (or contents) through a network. The communication module include hardware configured for operation, such as a transmitter, receiver, transceiver, codec, and at least one or more antennas.

The at least processor 250, which comprises circuitry such as integrated circuitry configured for operation, may perform a predefined operation based on whether the FSR sensor 130 of the case 100 receives an interrupt. For example, the processor 250 may perform an operation such as execution of a predefined application, display of a locking screen, acceptance of a call, termination of a call or control of a direction of the display screen, based on the reception of an interrupt. The processor 250 may be a microprocessor. The operation of the processor 250 based on the reception of an interrupt will be described in detail in the following with reference to FIGS. 7 to 9.

Figure 4:
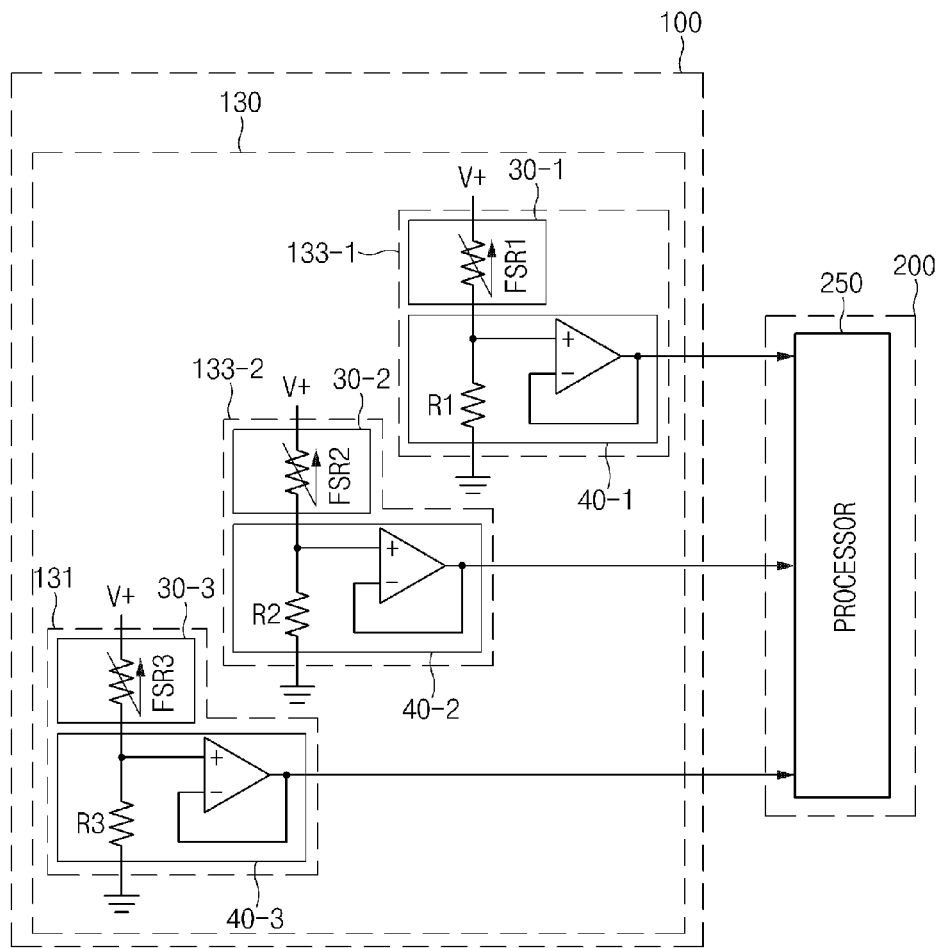
FIG. 4 is a circuit diagram illustrating a Force Sensing Resistor (FSR) sensor according to various embodiments of the present disclosure.

FIG. 4 is a circuit diagram illustrating an FSR sensor according to various embodiments of the present disclosure.

In FIG. 4, a case in which the case 100 includes one outer FSR sensor 131 and two inner FSR sensors 133-1 and 133-2 as in the embodiment described with reference to FIG. 1 will be described as an example.

Referring now to FIG. 4, the case 100 may include one outer FSR sensor 131 and two inner FSR sensors 133-1 and 133-2. Each of the FSR sensors 131, 133-1, and 133-2 may include an FSR element 30-1, 30-2, and 30-3 and an interrupt generating module 40-1, 40-2, and 40-3. The FSR element 30-1, 30-2, and 30-3 may reduce resistance value based on an applied pressure. The interrupt generating module 40-1, 40-2, and 40-3 may include a comparator circuit that generates an interrupt if a resistance value of the FSR element 30-1, 30-2, and 30-3 is a predefined value or less. The resistance value that acts as a reference for generation of an interrupt may be determined according to reference resistance values R1, R2, and R3 included in the comparator circuit. For example, referring to FIG. 4, as the resistance value of the FSR element decreases, a voltage applied to the reference resistors R1, R2, and R3 may increase. Accordingly, a voltage that is input to a non-inverting input terminal (+) of an operational amplifier (OP amp) increases, and if a voltage of a predefined reference voltage or higher is input, an interrupt may be generated in an output terminal of the operational amplifier. According to an embodiment, the reference resistance values R1, R2, and R3 may be the same or may be different according to the locations of the FSR sensors. According to an embodiment, interrupts that are output from the FSR sensors 131, 133-1, and 133-2 may be transferred to the processor 250 of the electronic device 200 through separate signal lines.

Figure 5:
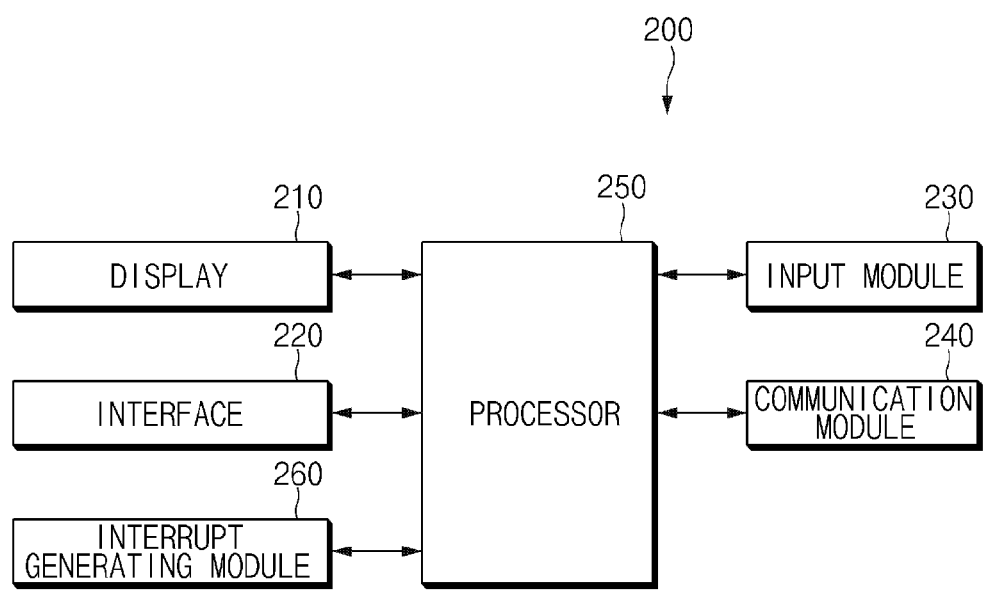
FIG. 5 is a block diagram of an electronic device according to various embodiments of the present disclosure.

FIG. 5 is a block diagram of an electronic device according to various embodiments of the present disclosure.

Referring now to FIG. 5, the electronic device 200 may include a display 210, an interface 220, an input module 230, a communication module 240, a processor 250, and an interrupt generating module 260. The electronic device 200 of FIG. 5 is somewhat similar to FIG. 3, but also further includes an interrupt generating module 260 as compared with the electronic device 100 of FIG. 3.

According to an embodiment, the interface 220 may receive a resistance value of the FSR sensor 130 from the case 100. The interface 220 may transfer a resistance value received from the case 100 to the interrupt generating module 260. According to an embodiment, the interface 220 may function as a passage that electrically connects the FSR sensor 130 of the case 100 and the interrupt generating module 260.

The interrupt generating module 260 may be electrically connected to an FSR sensor 130 (or an FSR element) of the case 100 to generate an interrupt based on the resistance value of the FSR element. For example, if the resistance value of the FSR element is a predefined value or less (that is, if a predefined pressure or higher is applied to the FSR element that changers (reduces) the resistance value of the FSR element), the interrupt generating module 260 may generate an interrupt. According to an embodiment, the interrupt generating module 260 may include a comparator circuit configured to generate an interrupt if the resistance value of the FST element is a predefined value or less. The FSR sensor 130 of the case 100 and the interrupt generating module 260 of the electronic device 200 will now be described with reference to FIG. 6.

Figure 6:
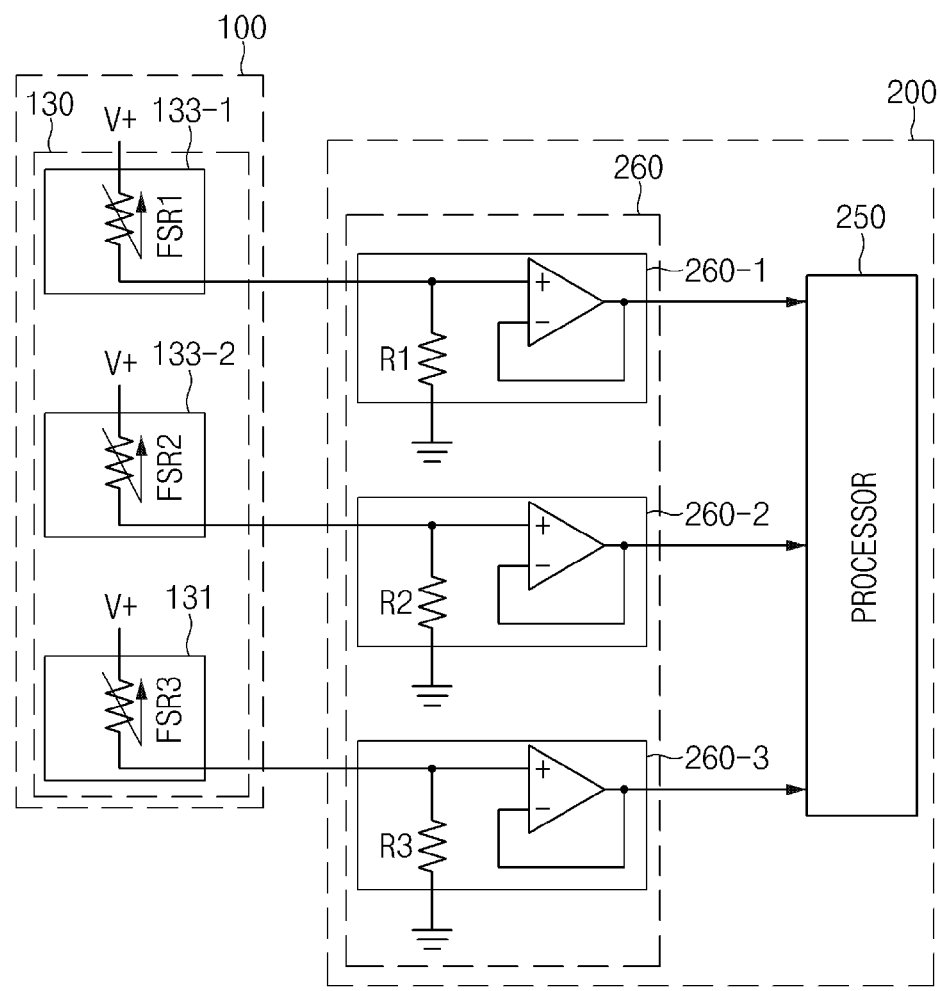
FIG. 6 is a circuit diagram of an FSR sensor and an interrupt generating module according to various embodiments of the present disclosure.

FIG. 6 is a circuit diagram of an FSR sensor and an interrupt generating module according to various embodiments of the present disclosure.

In FIG. 6, a case in which the case 100 includes one outer FSR sensor 131 and two inner FSR sensors 133-1 and 133-2 as in the embodiment described with reference to FIG. 1 will be described as an example.

Referring now to FIG. 6, the case 100 may include one outer FSR sensor 131 and two inner FSR sensors 133-1 and 133-2. Each of the FSR sensors 131, 133-1, and 133-2 may include an FSR element FSR1, FSR2, and FSR3. The resistance values of the FSR element FSR1, FSR2, and FSR3 may decrease based on the applied pressure. The FSR elements FSR1, FSR2, and FSR3 may be electrically connected to the interrupt generating module 260-1, 260-2, and 260-3 of the electronic device 200, respectively.

According to an embodiment, the electronic device 200 may include interrupt generating modules 260-1, 260-2, and 260-3 corresponding to the number of the FSR sensors 130 (or FSR elements). The interrupt generating module 260-1, 260-2, and 260-3 may include a comparator circuit that generates an interrupt if the resistance values of the FSR element FSR1, FSR2, and FSR3 are a predefined value or less. The resistance value, which acts as a reference for generation of an interrupt, may be determined according to reference resistance values R1, R2, and R3 included in the comparator circuit. For example, referring to FIG. 6, as the resistance value of the FSR element decreases, a voltage applied to the reference resistors R1, R2, and R3 may increase. Accordingly, a voltage that is input to a non-inverting input terminal (+) of an operational amplifier (OP amp) increases, and if a predefined reference voltage or higher is input, an interrupt may be generated in an output terminal of the operational amplifier. According to an embodiment, the reference resistance values R1, R2, and R3 may be the same or may be different according to the locations of the FSR sensors. According to an embodiment, interrupts that are output from the interrupt generating modules 260-1, 260-2, and 260-3 may be transferred to the processor 250 through separate signal lines.

FIG. 7 is a view illustrating an opening/closing state of a cover according to various embodiments of the present disclosure.

In FIG. 7, case 100 includes one outer FSR sensor 131 and two inner FSR sensors 133-1 and 133-2 as in the embodiment described with reference to FIG. 1 will be described as an example.

Figure 7A:
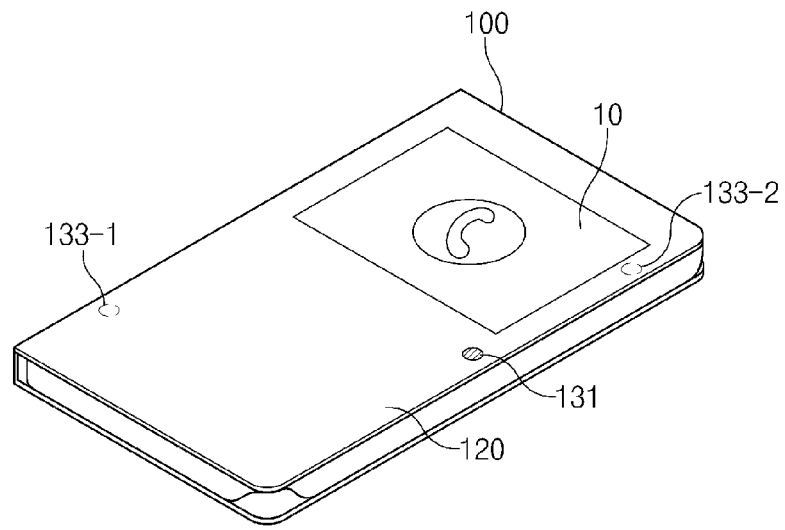
FIG. 7A and FIG. 7B are views illustrating an opening/closing state of a cover according to various embodiments of the present disclosure.

FIG. 7A illustrates a state in which the cover 120 of the case 100 is closed in the state in which the case 100 is coupled to the electronic device 200. Referring now to FIG. 7A, in the state in which the cover 120 is closed, an interrupt is not generated by the outer FSR sensor 131 (or the interrupt generating module connected to the outer FSR sensor 131), but an interrupt may be generated by the first inner FSR sensor 133-1 and the second inner FSR sensor 133-2.

According to an embodiment, if the cover 120 is closed, that is, if an interrupt is received from at least one of the inner FSR sensors 133-1 and 133-2 and an interrupt is not received from the outer FSR sensor 131, the processor 250 may display contents in an area corresponding to the transparent window 10 of the cover 120, because the processor has received sensor data from one or more FSR sensors that indicates the cover is closed. For example, referring to FIG. 7A, if receiving a call while the cover 120 is closed, the electronic device 200 may display a user interface that informs the user that the call is received, in an area of the display area corresponding to the transparent window 10. In another example, if receiving a message while the cover 120 is closed, the electronic device 200 may display a message reception alarm in an area of the display area corresponding to the transparent window 10.

When the electronic device 200 is situated in a pocket or a bag of the user, the cover 120 may be unintentionally moved such that an interval between the cover 120 and the electronic device 200 is widened. Accordingly, the electronic device 200 may determine that the cover is opened and perform an operation corresponding to the determination, and thus electric power may be unnecessarily consumed. According to various embodiment of the present disclosure, because a plurality of inner FSR sensors 133-1 and 133-2 are disposed at different locations with respect to a transverse axis of the cover 120, an interrupt may be generated by one (for example, the second inner FSR sensor 133-2) of the inner FSR sensors 133-1 and 133-2 even though an interval between the cover 120 and the electronic device 200 is widened. According to an embodiment, the processor 250 may determine that the cover 120 is opened and perform a corresponding operation only when neither of the inner FSR sensors 133-1 and 133-2 receives an interrupt. Accordingly, the electronic device 200 can reduce unnecessary power consumption.

Figure 7B:
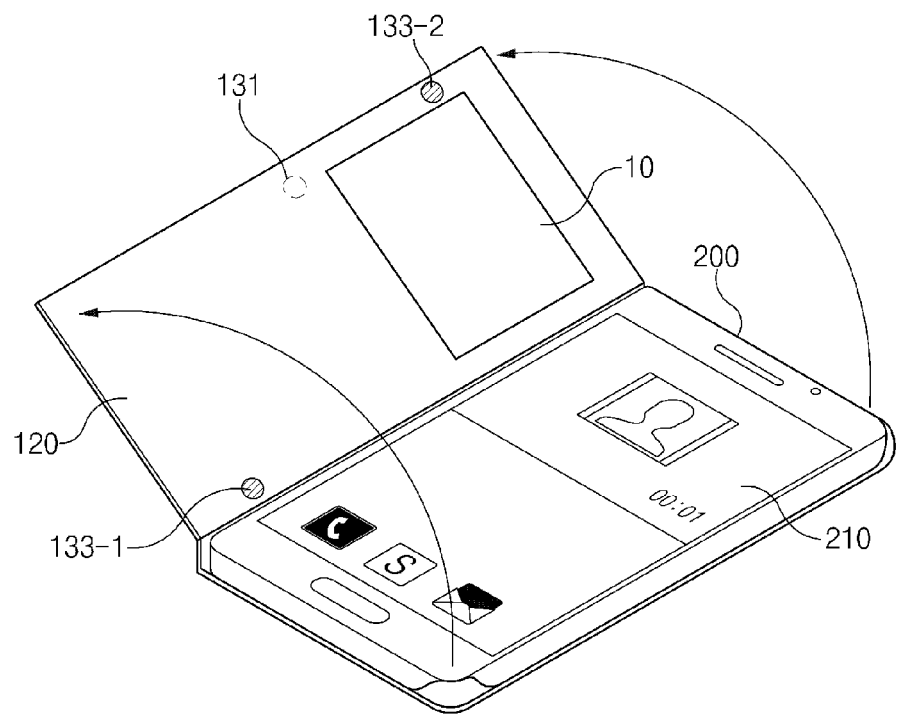

FIG. 7B illustrates a state in which the cover 120 of the case 100 is opened in the state in which the case 100 is coupled to the electronic device 200. Referring now to FIG. 7B, in the state in which the cover 120 is opened, an interrupt is generated neither by the outer FSR sensor 131 (or the interrupt generating module connected to the outer FSR sensor 131) nor by the first inner FSR sensor 133-1 and the second inner FSR sensor 133-2 (or the interrupt generating modules corresponding to the first inner FSR sensor 133-1 and the second inner FSR sensor 133-2).

According to an embodiment of the disclosure, if the cover 120 is opened in the state in which the cover 120 was previously closed, that is, if an interrupt is received from at least one of the inner FSR sensors 133-1 and 133-2 and an interrupt is not received in the state in which an interrupt is not received from the outer FSR sensor 131, the processor 250 may execute a predefined application or accept a reception call. For example, referring to FIG. 7B, if the cover 120 is opened in the state in which the cover 120 was closed, the electronic device 200 automatically accepts a reception call to perform a voice communication. As another example, the electronic device 200 may execute a messaging application if the cover 120 is opened in the state in which the cover 120 is closed.

According to an embodiment of the disclosure, if the cover 120 is opened in the state in which the cover 120 is closed, that is, if an interrupt is not received in the state in which an interrupt is received from at least one of the inner FSR sensors 133-1 and 133-2 and an interrupt is not received from any one of the outer FSR sensors 131, the processor 250 may display a locking screen. For example, if the cover 120 is opened in the state in which the display 210 is switched off, the electronic device 200 may display a locking screen.

FIG. 8 is a view illustrating an opening/closing state of a cover according to various embodiments of the present disclosure.

In FIG. 8, the case 100 includes one outer FSR sensor 131 and two inner FSR sensors 133-1 and 133-2 as in the embodiment described with reference to FIG. 1 will be described as an example.

Figure 8A:
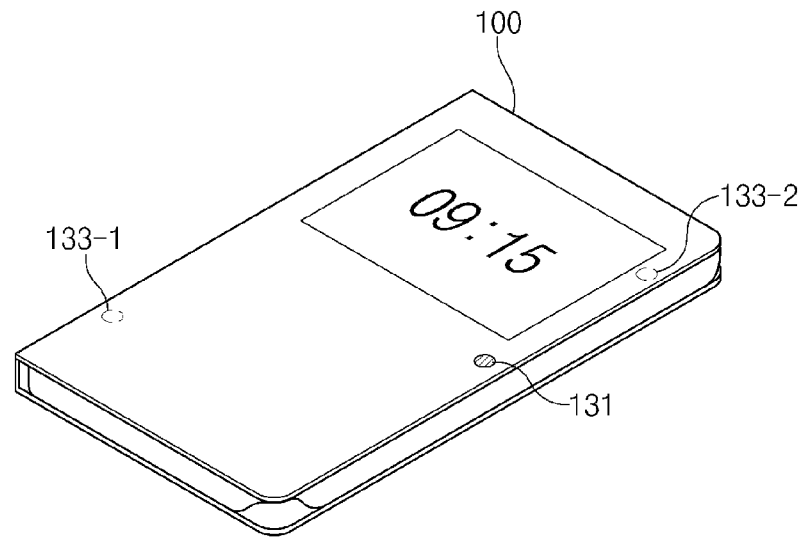
FIG. 8A and FIG. 8B are views illustrating an opening/closing state of a cover according to various embodiments of the present disclosure.

FIG. 8A illustrates a state in which the cover 120 of the case 100 is closed in the state in which the case 100 is coupled to the electronic device 200. Referring now to FIG. 8A, in the state in which the cover 120 is closed, an interrupt is not generated by the outer FSR sensor 131 (or the interrupt generating module connected to the outer FSR sensor 131), but an interrupt may be generated by the first inner FSR sensor 133-1 and the second inner FSR sensor 133-2.

According to an embodiment, if the cover 120 is closed, that is, if an interrupt is received from at least one of the inner FSR sensors 133-1 and 133-2 and an interrupt is not received from the outer FSR sensor 131, the processor 250 may display contents (or a user interface) displayed on the display 210 longitudinally (e.g. in a portrait view mode).

Figure 8B:
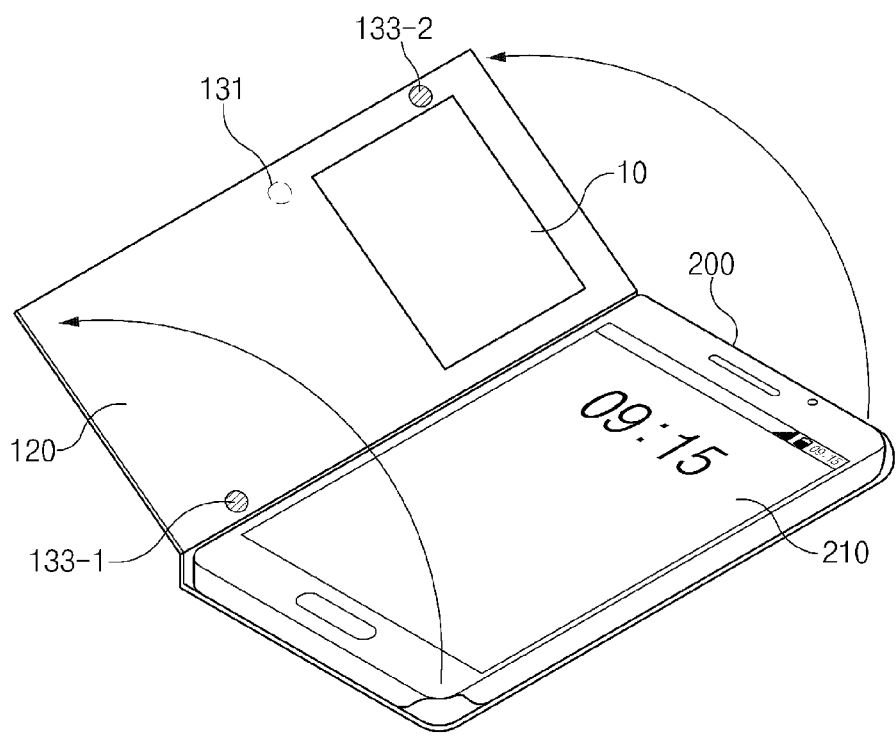

FIG. 8B illustrates a state in which the cover 120 of the case 100 is opened in the state in which the case 100 is coupled to the electronic device 200. Referring to FIG. 8B, in the state in which the cover 120 is opened, an interrupt is generated neither by the outer FSR sensor 131 (or the interrupt generating module connected to the outer FSR sensor 131) nor by the first inner FSR sensor 133-1 and the second inner FSR sensor 133-2 (or the interrupt generating modules corresponding to the first inner FSR sensor 133-1 and the second inner FSR sensor 133-2).

According to an embodiment, if the cover 120 is opened, that is, if an interrupt is received neither from the outer FSR sensors 131 and nor from the inner FSR sensors 133-1 and 133-2, the processor 250 may display contents (or a user interface) displayed on the display 210 longitudinally.

FIG. 9 is a view illustrating an opening/closing state of a cover according to various embodiments of the present disclosure.

In FIG. 9, a case in which the case 100 includes one outer FSR sensor 131 and two inner FSR sensors 133-1 and 133-2 as in the embodiment described with reference to FIG. 1 will be described as an example.

Figure 9A:
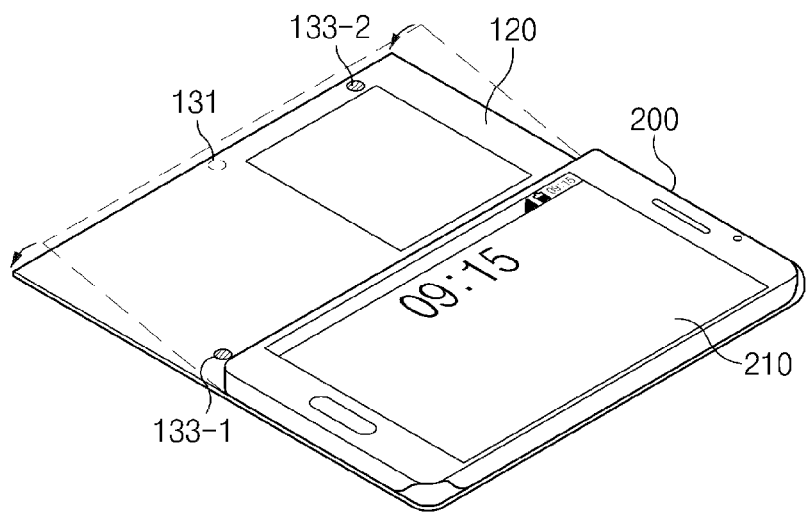
FIG. 9A, FIG. 9B and FIG. 9C are views illustrating an opening/closing state of a cover according to various embodiments of the present disclosure.
Figure 9B:
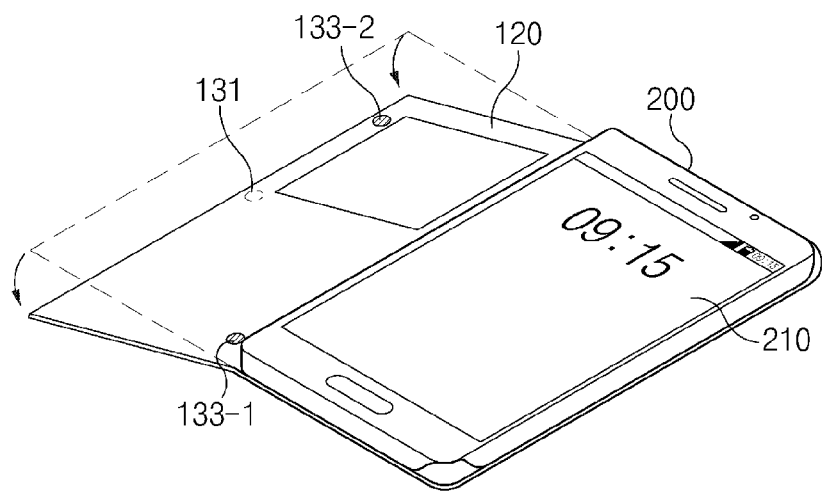

FIG. 9A illustrates a state in which the cover 120 of the case 100 is opened such that the outer surface of the cover 120 is in contact with the bottom in the state in which the case 100 is coupled to the electronic device 200. Referring to FIG. 9B, in the state in which the outer surface of the cover 120 is in contact with the bottom, an interrupt is generated by the outer FSR sensor 131 (or the interrupt generating module connected to the outer FSR sensor 131) but an interrupt is not generated by the first inner FSR sensor 133-1 and the second inner FSR sensor 133-2 (or the interrupt generating modules corresponding to the first inner FSR sensor 133-1 and the second inner FSR sensor 133-2).

According to an embodiment, if the outer surface of the cover 120 is in contact with the bottom, that is, if an interrupt is received from the outer FSR sensors 131 but an interrupt is not received from the inner FSR sensors 133-1 and 133-2, the processor 250 may display contents (or a user interface) displayed on the display 210 transversely (e.g. in a transverse view mode). For example, because the user frequently views contents such as a video while the cover 120 is opened such that the outer surface of the cover 120 is in contact with the bottom, the electronic device 100 may display contents displayed on the display 210 transversely if the outer surface of the cover 120 is in contact with the bottom.

FIG. 9B illustrates a state in which the cover 120 of the case 100 is opened in the state in which the case 100 is coupled to the electronic device 200. Referring to FIG. 9B, in the state in which the cover 120 is opened, an interrupt is generated neither by the outer FSR sensor 131 (or the interrupt generating module connected to the outer FSR sensor 131) nor by the first inner FSR sensor 133-1 and the second inner FSR sensor 133-2 (or the interrupt generating modules corresponding to the first inner FSR sensor 133-1 and the second inner FSR sensor 133-2).

According to an embodiment, if the cover 120 is opened, that is, if an interrupt is received neither from the outer FSR sensors 131 and nor from the inner FSR sensors 133-1 and 133-2, the processor 250 may display contents (or a user interface) displayed on the display 210 longitudinally.

Figure 9C:
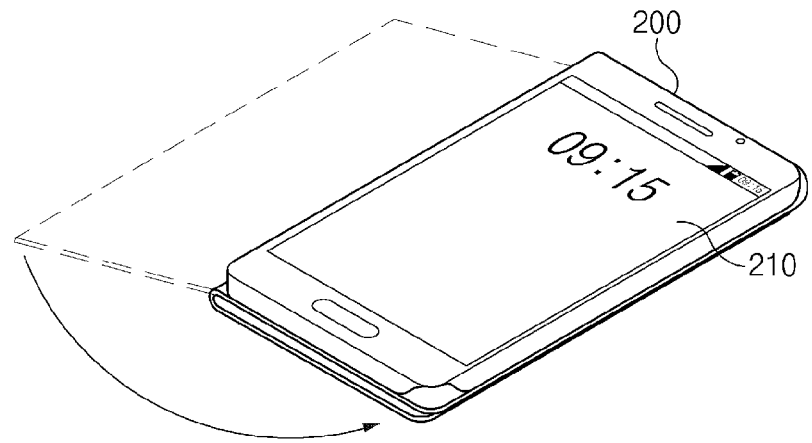

FIG. 9C illustrates a state in which the cover 120 of the case 100 is opened such that the inner surface of the cover 120 is in contact with the bottom and the outer surface of the cover 120 is in contact with the coupling member (or the rear surface of the electronic device 200) in the state in which the case 100 is coupled to the electronic device 200. Referring now to FIG. 9C, in the state in which the inner surface of the cover 120 is in contact with the bottom and the outer surface of the cover 120 is in contact with the coupling member, an interrupt is generated by the outer FSR sensor 131 (or the interrupt generating module connected to the outer FSR sensor 131) and an interrupt may be generated by the first inner FSR sensor 133-1 and the second inner FSR sensor 133-2 (or the interrupt generating modules corresponding to the first inner FSR sensor 133-1 and the second inner FSR sensor 133-2).

According to an embodiment of the disclosure, if the inner surface of the cover 120 is in contact with the bottom and the outer surface of the cover 120 is in contact with the coupling member, that is, interrupts are received from all the outer FSR sensors 131 and the inner FSR sensors 133, the processor 250 may display contents (or a user interface) displayed on the display 210 longitudinally.

FIG. 10 is a view illustrating an opening/closing state of a cover according to various embodiments of the present disclosure.

As in the embodiment described with reference to FIG. 2, a case in which the cover 120 of the case 100 includes a plurality of areas 121 and 123 that are foldable about a longitudinal axis of the cover 120, the first outer FSR sensor 131-1 and the first inner FSR sensor 133-1 are disposed in the first area 121, and the second outer FSR sensor 131-2 and the second inner FSR sensor 133-2 are disposed in the second area 123 will be described as an example in FIG. 10.

Figure 10A:
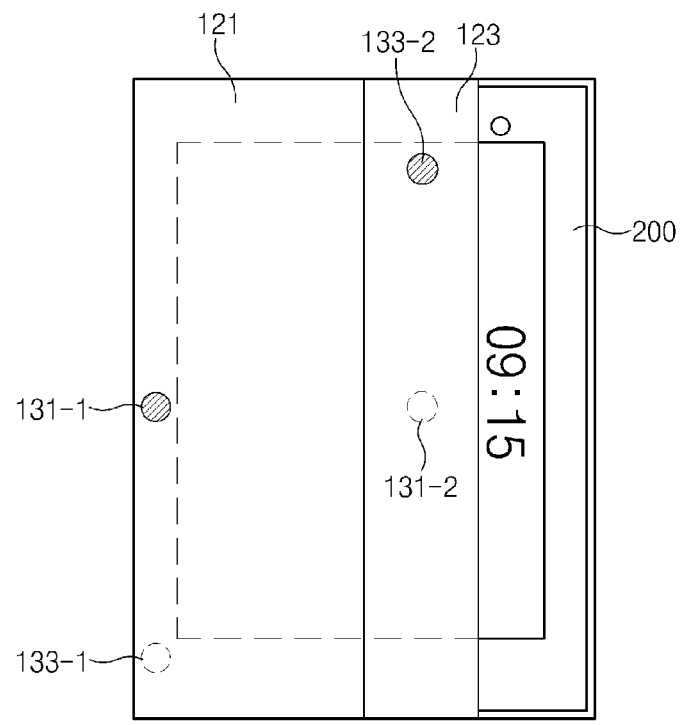
FIG. 10A and FIG. 10B are views illustrating an opening/closing state of a cover according to various embodiments of the present disclosure.

FIG. 10A illustrates a state in which the first area 121 of the cover 120 is closed and the second area 123 is opened in the state in which the case 100 is coupled to the electronic device 200. Referring now to FIG. 10A, in the state in which the second area of the cover 120 is opened, interrupts are generated by the second outer FSR sensor 131-2 (or the interrupt generating module connected to the second outer FSR sensor 131-2) and the first inner FSR sensor 133-1 (the interrupt generating module connected to the first outer FSR sensor 131-1), and no interrupt is generated by the first outer FSR sensor 131-1 (or the interrupt generating module connected to the first outer FSR sensor 131-1) and the second inner FSR sensor 133-2 (or the interrupt generating module connected to the second inner FSR sensor 133-2).

According to an embodiment of the disclosure, if the second area 123 of the cover 120 is opened, that is, an interrupt is received from one of the inner FSR sensor 133 and an interrupt is received from one of the outer FSR sensor 131, the processor 250 may display contents (or a user interface) on a part of the display area (for example, an area corresponding to the second area 123 of the cover 120). According to an embodiment, if the second area 123 of the cover 120 is opened, that is, if an interrupt is received from at least one of the inner FSR sensors 133-1 and 133-2 and an interrupt is received from one of the outer FSR sensor 131-1 and 133-2, the processor 250 may display contents (or a user interface) displayed on the display 210 transversely.

Figure 10B:
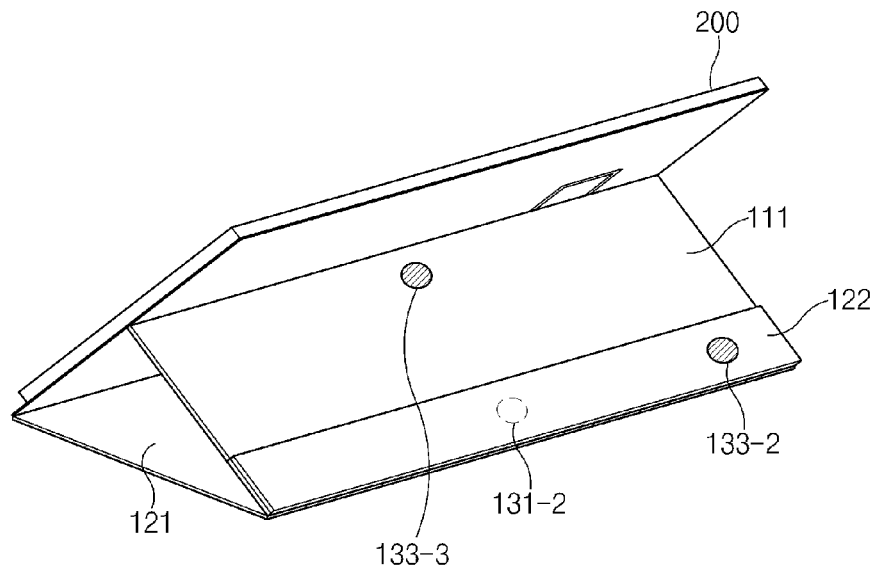

FIG. 10B illustrates a state in which the second area 123 of the cover 120 is in contact with a part of the coupling member such that the electronic device 200 is supported while the cover 120 is opened. FIG. 10B illustrates a case in which a third inner FSR sensor 133-3 is additionally disposed inside the foldable area 111 of the coupling member in FIG. 10A as an example.

Referring now to FIG. 10B, if the second area 123 of the cover 120 is in contact with a part 111 of the coupling member such that the electronic device 200 is supported while the cover 120 is opened, interrupts are generated by the second outer FSR sensor 131-2 (or the interrupt generating module connected to the second outer FSR sensor 131-2) and the first inner FSR sensor 133-1 (or the interrupt generating module connected to the first outer FSR sensor 131-1), and no interrupt is generated by the first outer FSR sensor 131-1 (or the interrupt generating module connected to the first outer FSR sensor 131-1), the second inner FSR sensor 133-2 (the interrupt generating module connected to the second inner FSR sensor 133-2), and the third inner FSR sensor 133-3 (or the interrupt generating module connected to the third inner FSR sensor 133-3).

According to an embodiment, if the second area 123 of the cover 120 is in contact with a part 111 of the coupling member such that the electronic device 200 is supported while the cover 120 is opened, that is, if an interrupt is received from one (for example, the first inner FSR sensor 133-1) of the inner FSE sensors 133-1 and 133-2 disposed in the cover 120, an interrupt is not received from the inner FSR sensor 133-3 disposed in the coupling member, and an interrupt is received from one (for example, the second outer FSR sensor 131-2) of the outer FSR sensors 131-1 and 131-2, the processor 250 may display contents (or a user interface) displayed on the display 210 transversely.

Meanwhile, an interruption generation state of the FSR sensor 130 may vary based on a disposition location of the FSR sensor 130 even in the same state. It should be understood that the disposition location of the FSR sensor 130 may be variously set, and the case in which the interruption generation state of the FSR sensor 130 becomes partially different as the disposition location of the FSR sensor 130 is changed also fall within the scope of the present disclosure. Furthermore, although the disclosure teaches that an interrupt is generated if a predefined pressure or higher is applied to the FSR sensor 130, it may be implemented such that an interrupt is generated if a predefined pressure or lower is applied to the FSR sensor 130 and an interrupt is not generated if a predefined pressure or higher is applied.

Figure 11:
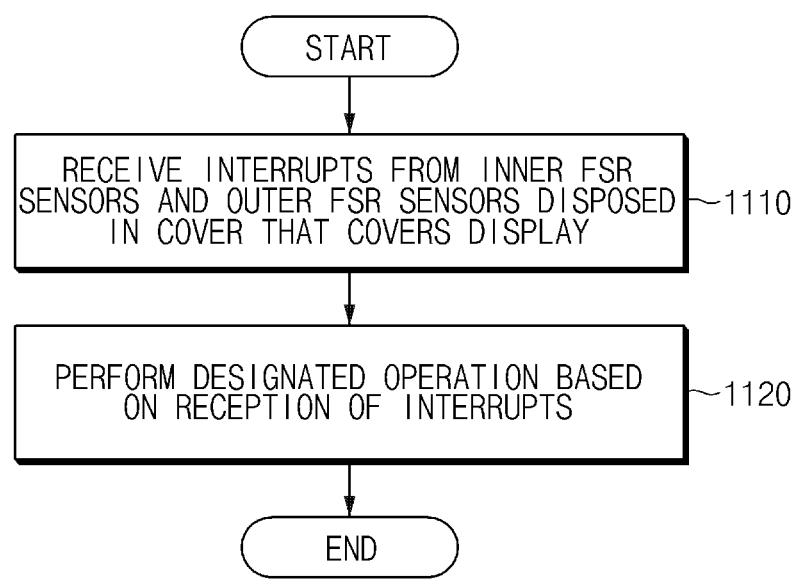
FIG. 11 is a flowchart illustrating a method of controlling an electronic device according to various embodiments of the present disclosure.

FIG. 11 is a flowchart illustrating an operational method of controlling an electronic device according to various embodiments of the present disclosure.

The flowchart of FIG. 10 may include processes that are performed by the electronic device 200 of FIG. 3 or FIG. 5. Accordingly, the contents about the electronic device of FIG. 3 or FIG. 5 may be applied to the flowchart of FIG. 11 even they are omitted in the following.

Referring now to FIG. 11, in operation 1110, the electronic device 200 may receive interrupts from the inner FSR sensor and the outer FSR sensor disposed in the cover. According to an embodiment, the electronic device 200 may be coupled to the case 100, and the cover 120 of the case 100 may be configured in a foldable fashion (e.g. having creases, hinges etc. to facilitate folding) to cover the display of the electronic device 200.

According to an embodiment, the FSR sensor 130 of the case 100 may sense a pressure sufficient to generate an interrupt (as previously discussed herein) in the electronic device 200. According to an embodiment, the FSR sensor 130 may generate an interrupt if a predefined pressure (or weight) or higher is applied thereto, as, for example, a predefined weight or higher typically reduces the resistance detected by the FSR sensor. According to an embodiment, the FSR sensor 130 may include at least one outer FSR sensor 131 and at least one inner FSR sensor 133. According to an embodiment, the outer FSR sensor 131 may be disposed on an inner surface of the cover 120 (or a surface that is exposed to the outside while the cover 120 is opened) to sense a pressure applied to the outer surface of the cover 120. According to an embodiment, the inner FSR sensor 133 may be disposed on an inner surface of the cover 120 (a surface that is opposite to the display surface of the electronic device 200 while the cover 120 is closed) to sense a pressure applied to the inner surface of the cover 120. According to an embodiment, when the FSR sensor 130 includes a plurality of outer FSR sensors 131 or a plurality of inner FSR sensors 133, the plurality of outer FSR sensors 131 or the plurality of inner FSR sensors 133 may be disposed in different locations of the cover with reference to the transverse axis of the cover 120 (or on the transverse axis of the cover 120). According to an embodiment, the cover 120 may include a plurality of areas that are foldable about longitudinal axes of the cover 120. According to an embodiment, at least one outer FSR sensor 131 may be disposed in each of the plurality of areas of the cover 120. According to an embodiment, at least one inner FSR sensor 133 may be disposed in each of the plurality of areas of the cover 120. A part of the coupling member 110 may be configured to be foldable about a longitudinal axis of the coupling member 110, and the inner FSR sensor 133 may be disposed inside the foldable area. According to an embodiment, the electronic device 200 may receive interrupts from at least one inner FSR sensor and at least one outer FSR sensor based on the opening/closing state of the cover 120.

According to an embodiment, in operation 1120, the electronic device 200 may perform a predefined operation based on whether the electronic device 200 has received interrupts from the inner FSR sensor and the outer FSR sensor.

According to an embodiment, if the cover 120 is closed, that is, if an interrupt is received from at least one of the inner FSR sensors 133 and an interrupt is not received from the outer FSR sensor 131, the electronic device 200 may display contents in an area corresponding to the transparent window 10 of the cover 120.

According to an embodiment, if the cover 120 is opened in the state in which the cover 120 is closed, that is, if an interrupt is not received from at least one of the inner FSR sensors 133 in the state in which an interrupt is received from at least one of the inner FSR sensors 133 and an interrupt is not received from any one of the outer FSR sensors 131, the electronic device 200 may execute a predefined application or accept a reception call.

According to an embodiment of the disclosure, if the cover 120 is opened in the state in which the cover 120 is closed, that is, if an interrupt is not received from at least one of the inner FSR sensors 133 in the state in which an interrupt is received from at least one of the inner FSR sensors 133 and an interrupt is not received from the outer FSR sensor 131, the electronic device 200 may display a locking screen.

According to an embodiment of the disclosure, if the cover 120 is closed, that is, if an interrupt is received from at least one of the inner FSR sensors 133 and an interrupt is not received from the outer FSR sensor 131, the electronic device 200 may display contents (or a user interface) displayed on the display 210 longitudinally.

According to an embodiment of the disclosure, if the cover 120 is opened, that is, if an interrupt is received neither from the outer FSR sensors 131 and nor from the inner FSR sensors 133, the electronic device 200 may display contents (or a user interface) displayed on the display 210 longitudinally.

According to an embodiment of the disclosure, if the outer surface of the cover 120 is in contact with the bottom, that is, if an interrupt is received from the outer FSR sensors 131 but an interrupt is not received from the inner FSR sensors 133-1 and 133-2, the electronic device 200 may display contents (or a user interface) displayed on the display 210 transversely.

According to an embodiment of the disclosure, if the cover 120 is opened, that is, if an interrupt is received neither from the outer FSR sensors 131, nor from the inner FSR sensors 133, the electronic device 200 may display contents (or a user interface) displayed on the display 210 longitudinally.

According to an embodiment, if the inner surface of the cover 120 is in contact with the bottom and the outer surface of the cover 120 is in contact with the coupling member, that is, interrupts are received from all the outer FSR sensors 131 and the inner FSR sensors 133, the electronic device 200 may display contents (or a user interface) displayed on the display 210 longitudinally.

According to an embodiment, if one of the plurality of areas of the cover 120 is opened, that is, an interrupt is received from one of the inner FSR sensor 133 and an interrupt is received from one of the outer FSR sensor 131, the electronic device 200 may display contents (or a user interface) on a part of the display area (for example, a display area corresponding to an opened area of the cover 120).

According to an embodiment, if one of the foldable areas of the cover 120 is in contact with a part of the coupling member while the cover 120 is opened, that is, if an interrupt is received from one of the inner FSR sensor disposed in the cover 120, an interrupt is not received from the inner FSR sensor disposed in the coupling member, and an interrupt is received from one of the outer FSR sensors, the electronic device 200 may display contents (or a user interface) displayed on the display 210 transversely.

Figure 12:
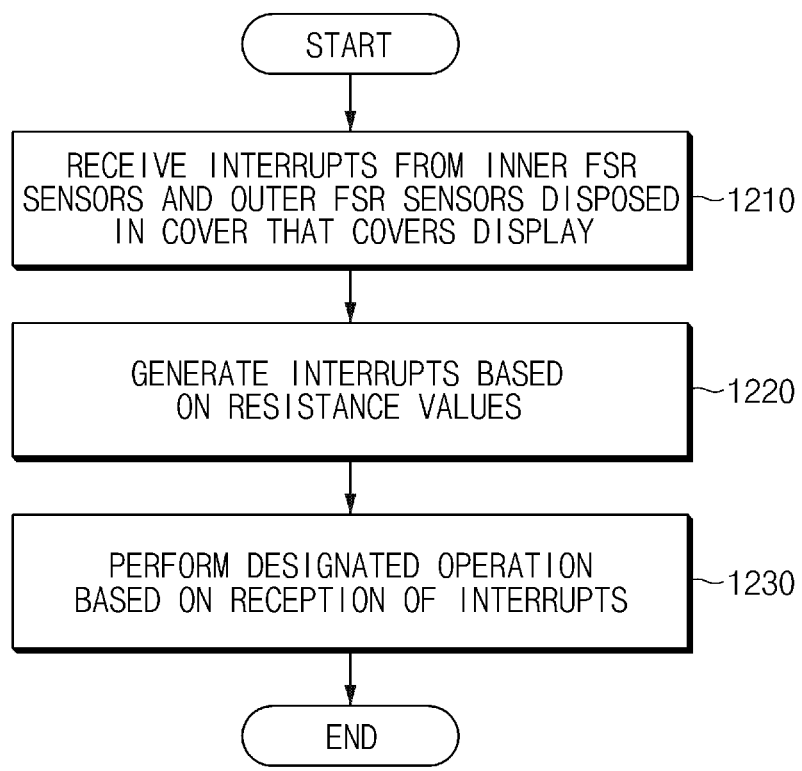
FIG. 12 is a flowchart illustrating a method of controlling an electronic device according to various embodiments of the present disclosure.

FIG. 12 is a flowchart illustrating operation of a method of controlling an electronic device according to various embodiments of the present disclosure.

The flowchart of FIG. 12 may include processes that are performed by the electronic device 200 of FIG. 3 or FIG. 5. Accordingly, the contents about the electronic device 200 of FIG. 3 or FIG. 5 may be applied to the flowchart of FIG. 12 even they are omitted in the following.

Referring now to FIG. 12, in operation 1210, the electronic device 200 may receive resistance values from the inner FSR sensor and the outer FSR sensor disposed in the cover. According to an embodiment, the electronic device 200 may be coupled to the case 100, and the cover 120 of the case 100 may be configured in a foldable fashion to cover the display of the electronic device 200. According to an embodiment, if a pressure (or weight) is applied to the FSR sensor 130 of the case, the FSR sensor 130 may output a resistance value corresponding to the applied pressure. According to an embodiment, as a pressure (or force) applied to a surface the FSR sensor 130 increases, resistance value may decrease. According to an embodiment, the FSR sensor 130 may include at least one outer FSR sensor 131 and at least one inner FSR sensor 133.

According to an embodiment, in operation 1220, the electronic device 200 may generate an interrupt based on a resistance value received from the FSR sensor 130 (for example, the inner FSR sensor or the outer FSR sensor). According to an embodiment, if the resistance value of the FSR sensor 130 is a predefined value or less (that is, a predefined pressure or higher is applied to the FSR element), the electronic device 200 may generates an interrupt. According to an embodiment, the electronic device 200 may include an interrupt generating module 260 electrically connected to the FSR sensor 130. According to an embodiment, the electronic device 200 may include an interrupt generating module 260 corresponding to A number of the FSR sensors 130.

According to an embodiment, in operation 1230, the electronic device 200 may perform a predefined operation based on whether an interrupt is generated.

According to an embodiment, if the cover 120 is closed, that is, if an interrupt is generated by at least one of the interrupt generating modules connected to the inner FSR sensors 133 and an interrupt is not generated by the interrupt generating module connected to the outer FSR sensor 131, the electronic device 200 may display contents in an area corresponding to the transparent window 10 of the cover 120.

According to an embodiment, if the cover 120 is opened in the state in which the cover 120 was closed, that is, if an interrupt is not generated by the interrupt generating modules connected to the inner FSR sensors 133 while an interrupt is generated by at least one of the interrupt modules connected to the inner FSR sensors 133 and an interrupt is not generated by the interrupt module connected to the outer FSR sensor 131, the electronic device 200 may execute a predefined application or accept a reception call.

According to an embodiment, if the cover 120 is opened in the state in which the cover 120 was closed, that is, if an interrupt is not generated by the interrupt generating modules connected to the inner FSR sensors 133 in the state in which an interrupt is generated by at least one of the interrupt modules connected to the inner FSR sensors 133 and an interrupt is not generated by the interrupt module connected to the outer FSR sensor 131, the electronic device 200 may display a locking screen.

According to an embodiment, if the cover 210 is closed, that is, if an interrupt is generated by at least one of the interrupt generating modules connected to the inner FSR sensors 133 and an interrupt is not generated by the interrupt generating module connected to the outer FSR sensor 131, the electronic device 200 may display contents (or a user interface) on the display 210 longitudinally.

According to an embodiment, if the cover 120 is opened, that is, if an interrupt is not generated by any one of the interrupt generating modules connected to the outer FSR sensors 131 and nor from the inner FSR sensors 133, the electronic device 200 may display contents (or a user interface) displayed on the display 210 longitudinally.

According to an embodiment, if the outer surface of the cover 120 is in contact with the bottom, that is, if an interrupt is generated by the interrupt generating modules connected to the outer FSR sensors 131 but an interrupt is not generated by the interrupt generating modules connected to the inner FSR sensors 133, the electronic device 200 may display contents (or a user interface) displayed on the display 210 transversely.

According to an embodiment, if the cover 120 is opened, that is, if an interrupt is generated neither by the interrupt generating modules connected to the outer FSR sensors 131 and nor by the interrupt generating modules connected to the inner FSR sensors 133, the electronic device 200 may display contents (or a user interface) displayed on the display 210 longitudinally.

According to an embodiment, if the inner surface of the cover 120 is in contact with the bottom and the outer surface of the cover 120 is in contact with the coupling member, that is, interrupts are generated by all the interrupt generating modules connected to the outer FSR sensors 131 and the inner FSR sensors 133, the electronic device 200 may display contents (or a user interface) displayed on the display 210 longitudinally.

According to an embodiment, if one of the plurality of areas of the cover 120 is opened, that is, an interrupt is generated by one of the interrupt generating modules connected to the inner FSR sensors 133 and an interrupt is generated by one of the interrupt modules connected to the outer FSR sensors 131, the electronic device 200 may display contents (or a user interface) on a part (a portion) of the display area (for example, a display area corresponding to an opened area of the cover 120).

According to an embodiment, if one of the foldable areas of the cover 120 is in contact with a part of the coupling member while the cover 120 is opened such that the electronic device 200 is supported, that is, if an interrupt is generated by one of the interrupt generating modules of the inner FSR sensors disposed in the cover 120, an interrupt is not generated by the interrupt generated module connected to the inner FSR sensors disposed in the coupling member, and an interrupt is generated by one of the interrupt generating modules connected to the outer FSR sensors, the electronic device 200 may display contents (or a user interface) displayed on the display 210 transversely.

Figure 13:
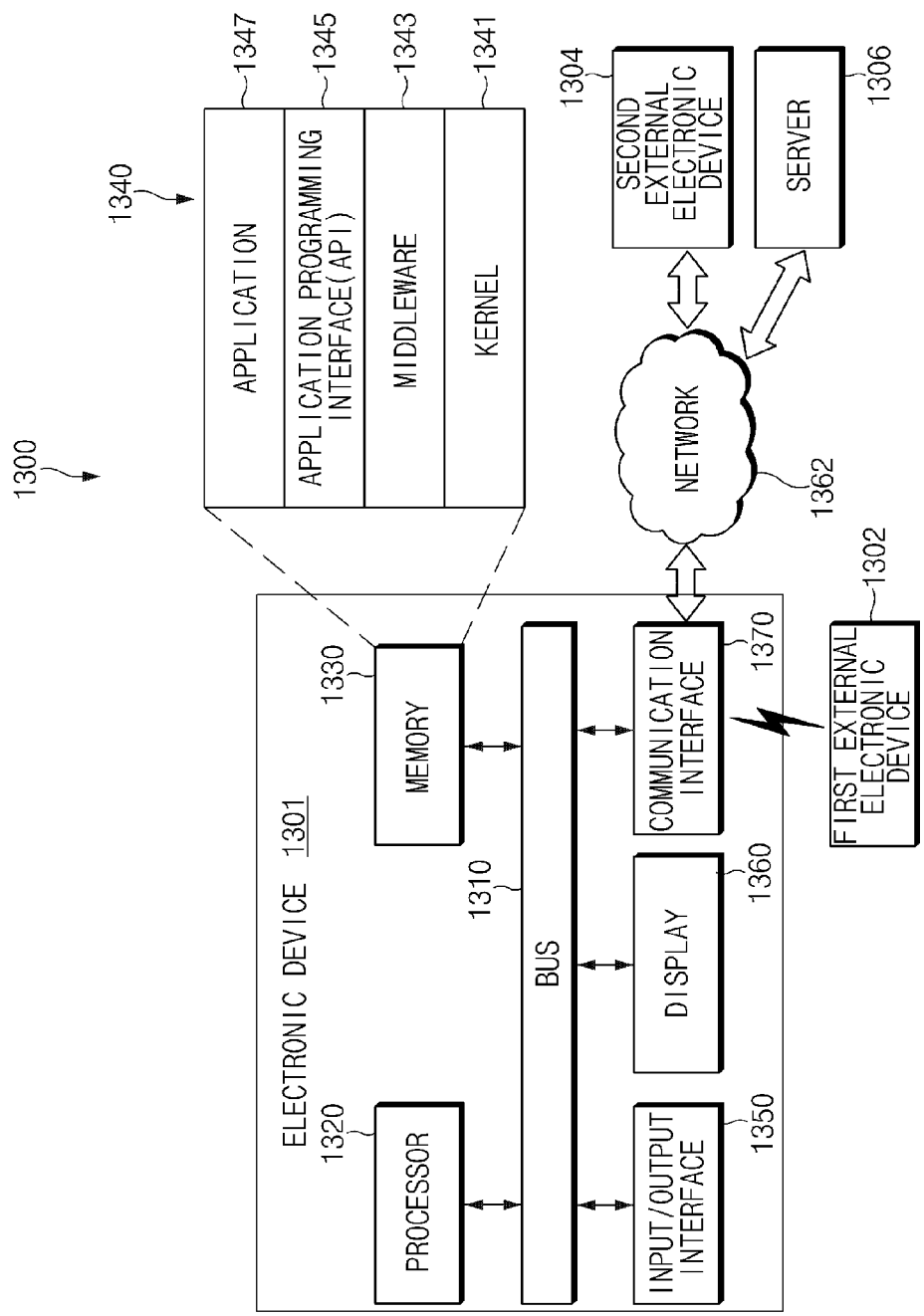
FIG. 13 is a view illustrating an electronic device in a network environment according to various embodiments of the present disclosure.

FIG. 13 is a view illustrating an electronic device in a network environment according to various embodiments of the present disclosure.

The electronic device 1301 in an environment 1300 according to various embodiments will be described with reference to FIG. 13. An electronic device 1301 may include, for example, the entirety or a part of the electronic device 200 of FIG. 3 or FIG. 5. Referring to FIG. 1, the electronic device 1301 may include a bus 1310, at least one processor 1320, a non-transitory memory 1330, an input/output interface 1350, a display 1360, and a communication interface 1370. In some embodiments, the electronic device 1301 may exclude at least one of the components or may additionally include another component.

The bus 1310 may include, for example, a circuit that connects the components 1310 to 1370 and transfers communications (for example, control messages and/or data) between the components.

The at least one processor 1320 may include one or more of a central processing unit (CPU), an application processor (AP), or a communication processor (CP). The at least one processor 1320, is comprised of integrated circuitry configured for operation. The at least one processor 1320, for example, may execute operations or data processing related to the control and/or communication of at least one other component of the electronic device 1301.

The non-transitory memory 1330 may include volatile and/or nonvolatile memories. The memory 1330, for example, may store commands or data related to at least one other component of the electronic device 1301. According to an embodiment, the memory 1330 may store software and/or a program 1340.

The program 1340, for example, may include a kernel 1341, middleware 1343, an application programming interface (API) 1345, and/or an application program (or an application) 1347. At least some of the kernel 1341, the middleware 1343, or the API 1345 may be referred to as an operating system (OS).

The kernel 1341, for example, may control or manage system resources (for example, the bus 1310, the processor 1320, and the memory 1330) that are used to execute operations or functions implemented in the other programs (for example, the middleware 1343, the API 1345, or the applications 1347). The kernel 1341 may provide an interface through which the middleware 1343, the API 1345, or the applications 1347 access individual components of the electronic device 1301 to control or manage the system resources.

The middleware 1343, for example, may function as an intermediary that allows the API 1345 or the applications 1347 to communicate with the kernel 1341 to exchange data. The middleware 1343 may process one or more work requests received from the application programs 1347, according to their priorities. For example, the middleware 1343 may give a priority, by which a system resource (for example, the bus 1310, the processor 1320, or the memory 1330) of the electronic device 1301 may be used, to at least one of the application programs 1347 and process the one or more request for work.

The API 1345 is an interface used, by the application 1347, to control a function provided by the kernel 1341 or the middleware 1343, and may include, for example, at least one interface or function (for example, an instruction), for example, for file control, window control, image processing, and text control.

The input/output interface 1350, for example, may function as an interface that may transfer commands or data that are input from the user or another external device to another component(s) of the electronic device 1301. The input/output interface 1350 may output commands or data received from another component(s) of the electronic device to the user or anther external device 1301.

According to an embodiment of the present disclosure, the display 1360 may include a liquid crystal display (LCD), a light emitting diode (LED) display, an organic light emitting diode (OLED) display, a micro electromechanical system (MEMS) display, and an electronic paper display. The display 1360, for example, may display various contents (for example, a text, an image, a video, an icon, and a symbol). The display 1360 may include a touch screen and receive, for example, a touch, a gesture, a proximity, or a hovering input using an electronic pen or the user's body.

The communication interface 1370 (for example, the communication module 1010), for example, may set a communication between the electronic device 1301 and an external device (for example, a first external electronic device 1302, a second external electronic device 1304, or a server 1306 (For example, an IMS server 500)). For example, the communication interface 1370 may be connected to a network 1362 through a wireless communication or a wired communication to communicate with the external device (for example, the second external electronic device 1304 or the server 1306). The communication interface 1370 may be comprised of hardware such as a transmitter, a receiver, or a transceiver, a codec, and one or more antennas to transmit or receive communication with first electronic device 1302 or via network 1362 to a second external device 1304 and/or server 1306.

The wireless communication is, for example, a cellular communication protocol, and, for example, may use at least one of long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Furthermore, the wireless communication, for example, may include a short range communication 1364. The short range communication 1364, for example, may include at least one of wireless fidelity (Wi-Fi), Bluetooth, a near field communication (NFC), or a global navigation satellite system (GNSS). The GNSS may include at least one of, for example, a global positioning system (GPS), a global navigation satellite system (Glonass), a Beidou navigation satellite system (hereinafter, "Beidou"), the European global satellite-based navigation system (Galileo), according to an in-use area or a bandwidth. Hereinafter, in the present disclosure, the "GPS" may be interchangeably used with the "GNSS".

The wired communication may include at least one of, for example, a universal serial bus (USB), a high definition multimedia interface (HDMI), recommended standard-232 (RS-232), and a plain old telephone Service (POTS). The network 1362 may include at least one of communication networks, for example, a computer network (for example, a LAN or a WAN), the Internet, or a telephone network.

The first and second external electronic devices 1302 and 1304 may be the same or different type devices than the electronic device 1301. According to an embodiment, the server 1306 may include a group of one or more servers (for example, IMS servers 500 or location servers 600). According to various embodiments of the present disclosure, all or some of the operations executed by the electronic device 1301 may be executed by another or a plurality of electronic devices (for example, the electronic devices 1302, 1304 and 1304 or the servers 1306). According to an embodiment of the present disclosure, when the electronic device 1301 should execute some functions or services automatically or upon request, it may request at least some functions associated with the functions or services from another device (for example, the electronic devices 1302 and 1304 or the server 1306), instead of or in addition to directly executing the functions or services. The other electronic device(s) (for example, the electronic device 1302 or 1304 or the server 1306) may execute a requested function or an additional function, and may transfer the result to the electronic device 1301. The electronic device 1301 may process the received result directly or additionally, and may provide a requested function or service. To this end, for example, cloud computing, distributed computing, or client-server computing technologies may be used.

Figure 14:
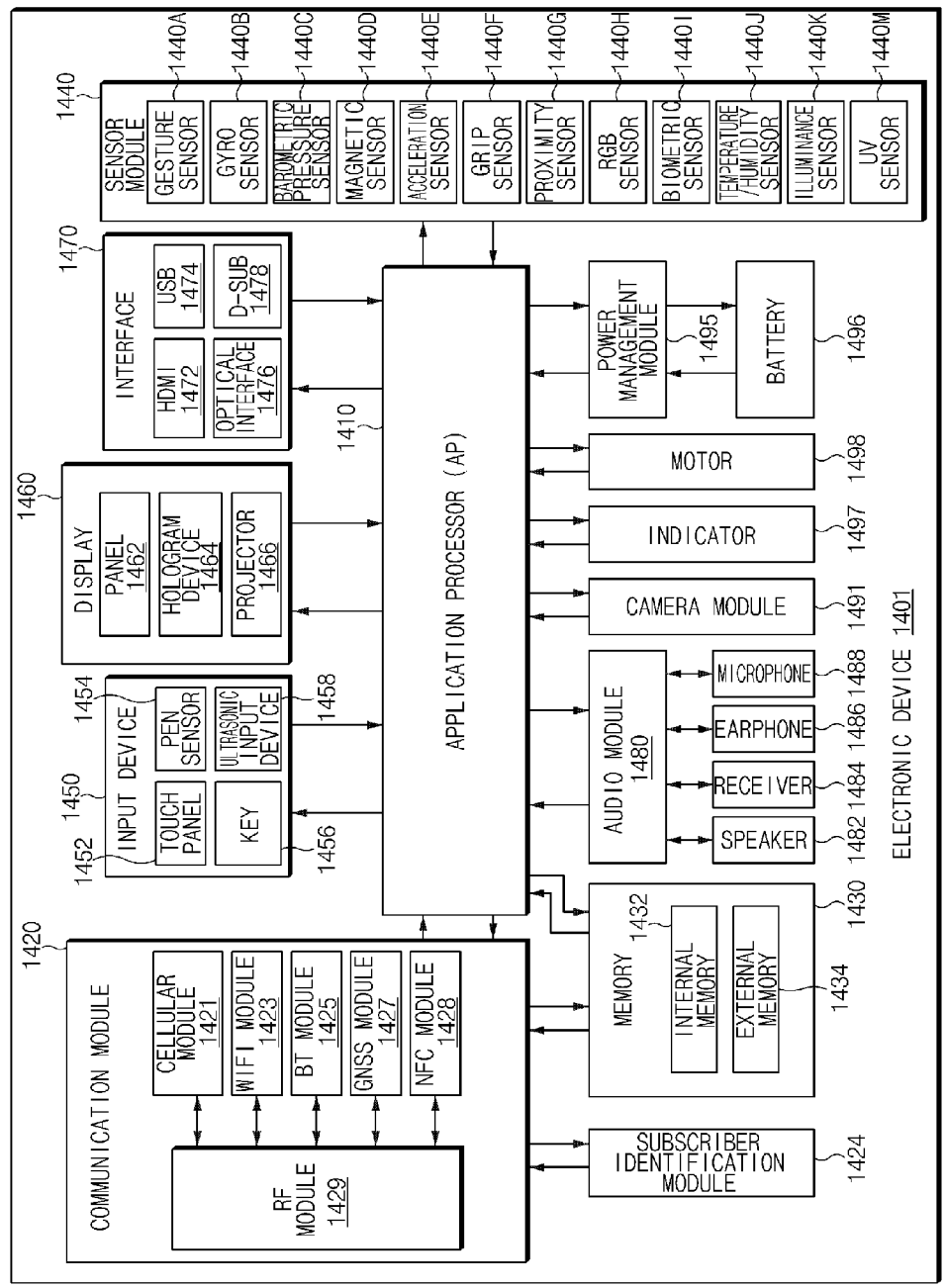
FIG. 14 is a block diagram of an electronic device according to various embodiments.

FIG. 14 is a block diagram of an electronic device 1401 according to various embodiments. An electronic device 1401 may include, for example, the entirety or a part of the electronic device 200 of FIG. 3 or FIG. 5. Referring now to FIG. 14, the electronic device 1401 may include at least one processor (for example, an application processor (AP) 1410), a communication module 1420, a subscriber identification module (SIM) card 1424, a non-transitory memory 1430, a sensor module 1440, an input device 1450, a display 1460, an interface 1470, an audio module 1480, a camera module 1491, a power management module 1495, a battery 1496, an indicator 1497, or a motor 1498.

The at least one processor 1410 includes integrated circuitry that may control a plurality of hardware or software components connected to the processor 1410 by driving an operating system or an application program and performing a variety of data processing and calculations. The processor 1410 may be implemented by, for example, a System on Chip (SoC). According to an embodiment, the processor 1410 may further include a graphical processing unit (GPU) and/or an image signal processor. The processor 1410 may include at least some (for example, a cellular module 1421) of the components illustrated in FIG. 14. The processor 1410 may load instructions or data, received from at least one other component (for example, a non-volatile memory), in a volatile memory to process the loaded instructions or data, and may store various types of data in a non-volatile memory.

The communication module 1420 may have the same or similar structure to the communication interface 1370 of FIG. 13. The communication module 1420 may include, for example, a cellular module 1421, a Wi-Fi module 1423, a Bluetooth module 1425, a GNSS module 1427 (for example, a GPS module, a Glonass module, a Beidou module, or a Galileo module), an NFC module 1428, and a radio frequency (RF) module 1429.

The cellular module 1421, for example, may provide a voice call, a video call, a text message service, or an Internet service through, for example, a communication network. According to an embodiment, the cellular module 1421 may distinguish between and authenticate electronic devices 1401 within a communication network using a subscriber identification module (for example, a SIM card 1424). According to an embodiment of the present disclosure, the cellular module 1421 may perform at least some of the functions which may be provided by the at least one processor 1410. According to an embodiment, the cellular module 1421 may include a communication processor (CP).

According to some embodiments, at least some (two or more) of the cellular module 1421, the Wi-Fi module 1423, the Bluetooth module 1425, the GNSS module 1427, and the NFC module 1428 may be included in one Integrated Chip (IC) or IC package.

The RF module 1429 may transmit/receive, for example, a communication signal (for example, an RF signal). The RF module 1429 may include hardware, for example, transmitter, receiver, a transceiver, a Power Amp Module (PAM), a frequency filter, a Low Noise Amplifier (LNA), or an antenna. According to another embodiment, at least one of the cellular module 1421, the Wi-Fi33 module 1423, the Bluetooth module 1425, the GNSS module 1427, or the NFC module 1428 may transmit and receive an RF signal through a separate RF module.

The subscriber identification module 1424 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 1430 may include, for example, an internal memory 1432 or an external memory 1434. The internal memory 1432 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only Memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 1434 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1434 may be functionally and/or physically connected to the electronic device 1401 through various interfaces.

The sensor module 1440 may measure, for example, a physical quantity or detect an operation state of the electronic device 1401, and may convert the measured or detected information to an electrical signal. The sensor module 1440 may include, for example, at least one of a gesture sensor 1440A, a gyro sensor 1440B, an atmospheric pressure sensor 1040C, a magnetic sensor 1040D, an acceleration sensor 1040E, a grip sensor 1040F, a proximity sensor 1040G, a color sensor 1040H (for example, red, green, and blue (RGB) sensor), a biometric sensor 1040I, a temperature/humidity sensor 1440J, an illumination sensor 1440K, and an ultraviolet (UV) sensor 1040M. Additionally or alternatively, the sensor module 1440 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. In some embodiments, the electronic device 1401 may further include a processor configured to control the sensor module 1440 as a part of or separately from the processor 1410, and may control the sensor module 1440 while the processor 1410 is in a sleep state.

The input device 1450 may include, for example, a touch panel 1452, a (digital) pen sensor 1454, a key 1456, or an ultrasonic input device 1458. The touch panel 1452 may use at least one of, for example, a capacitive type, a resistive type, an infrared type, and an ultrasonic type. The touch panel 1452 may further include a control circuit. The touch panel 1452 may further include a tactile layer, and provide a tactile reaction to a user.

The (digital) pen sensor 1454 may include, for example, a recognition sheet which is a part of the touch panel or a separate recognition sheet. The key 1456 may include, for example, a physical button, an optical key, or a keypad. The ultrasonic input device 1458 may detect ultrasonic waves generated by an input tool through a microphone (for example, a microphone 1488) and may identify data corresponding to the detected ultrasonic waves.

The display 1460 (for example, the display 1030) may include a panel 1462, a hologram device 1464, or a projector 1466. The panel 1462 may be implemented to be, for example, flexible, transparent, or wearable. The panel 1462 may be formed as a single module together with the touch panel 1452. The hologram device 1464 may show a three dimensional image in the air using an interference of light. The projector 1466 may display an image by projecting light onto a screen. The screen may be located, for example, in the interior of or on the exterior of the electronic device 1401. According to an embodiment, the display 1460 may further include a control circuit for controlling the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. The interface 1470 may be included in, for example, the communication interface 1370 illustrated in FIG. 13. Additionally or alternatively, the interface 1470 may include, for example, a Mobile High-definition Link (MHL) interface, a Secure Digital (SD) card/Multi-Media Card (MMC) interface, or an Infrared Data Association (IrDA) standard interface.

The audio module 1480 may bilaterally convert, for example, a sound and an electrical signal. At least some elements of the audio module 1480 may be included in, for example, the input/output interface 1350 illustrated in FIG. 13. The audio module 1480 may process sound information input or output through, for example, a speaker 1482, a receiver 1484, earphones 1486, the microphone 1488, or the like.

The camera module 1491 is a device which may photograph a still image and a dynamic image. According to an embodiment, the camera module 291 may include one or more image sensors (for example, a front sensor or a back sensor), a lens, an Image Signal Processor (ISP) or a flash (for example, an LED or xenon lamp).

The power management module 1495 may manage, for example, power of the electronic device 1401. According to an embodiment, the power management module 1495 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1496, and a voltage, a current, or a temperature while charging. The battery 1496 may include, for example, a rechargeable battery and/or a solar battery.

The indicator 1497 may indicate particular status of the electronic device 1401 or a part thereof (for example, the processor 1410), for example, a booting status, a message status, a charging status, or the like. The motor 1498 may convert an electrical signal into mechanical vibrations, and may generate a vibration or haptic effect. Although not illustrated, the electronic device 1401 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow (MediaFlo™).

Each of the elements described in the specification may include one or more components, and the terms of the elements may be changed according to the type of the electronic device. According to various embodiments, the electronic device may omit some components or may further include other components. Some of the elements of the electronic device according to various embodiments may be coupled to form one entity, and may perform the same functions of the corresponding elements before they are coupled.

Figure 15:
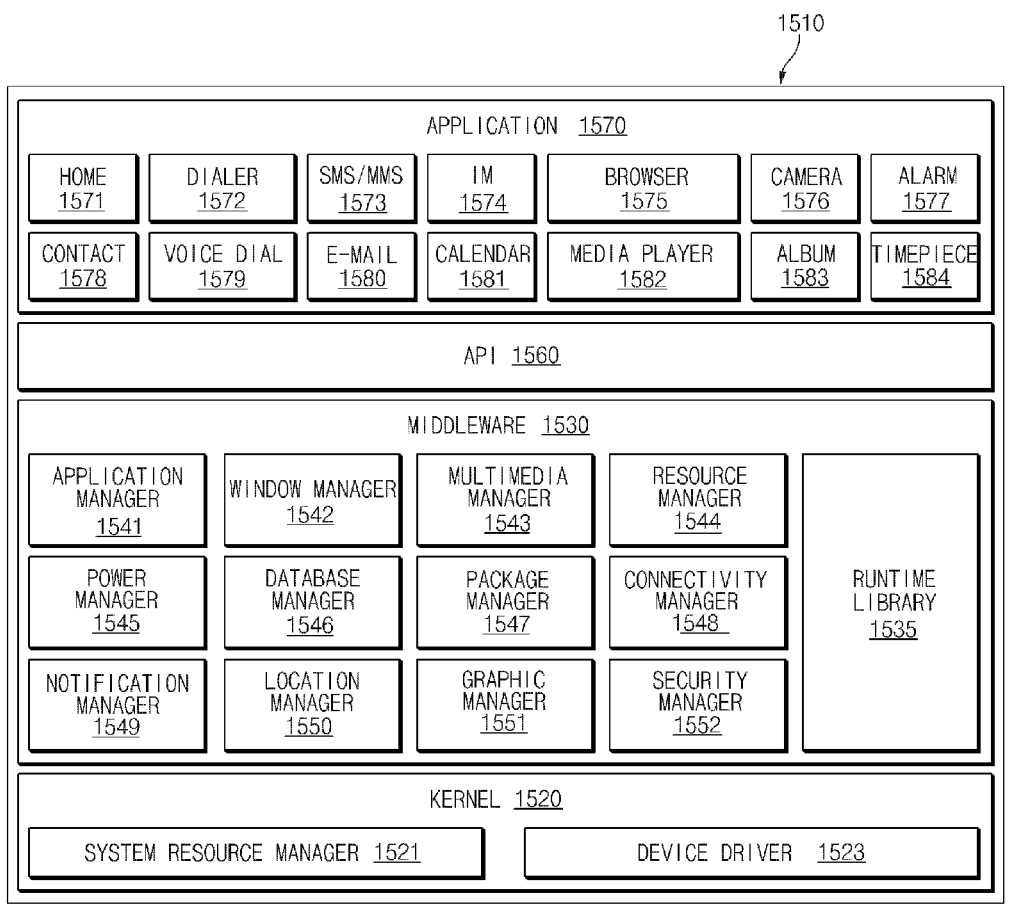
FIG. 15 is a block diagram of a program module according to various embodiments.

FIG. 15 is a block diagram of a program module according to various embodiments of the disclosure.

According to an embodiment, the program module 1510 (for example, a program 1340) comprises a non-transitory machine readable medium (memory) that may include instructions when executed by hardware such as processor to execute an operating system (OS) that controls resources related to an electronic device, and various application programs (for example, an application program 1347) that are driven on an operating system. The operating system may be, for example, Android, iOS, Windows, Symbian, Tizen, Bada, or the like.

The program module 1510 may include a kernel 1520, a middleware 1530, an application programming interface (API) 1560, and/or applications 1570. At least a part of the program module 1510 may be preloaded on an electronic device or may be downloaded from external electronic devices (for example, first and second external electronic devices 1304 and 1304 and a server 1306) on to a non-transitory memory.

The kernel 1520 (for example, the kernel 1341) may include, for example, a system resource manager 1521 and/or a device driver 1523. The system resource manager 1521 may control, allocate, or retrieve the system resources. According to one embodiment, the system resource manager 1521 may include a process management unit, a memory management unit, or a file system management unit. The device driver 1523 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 1530 may provide a function required by the applications 1670 in common or provide various functions to the applications 1570 through the API 1570 so that the applications 1560 can efficiently use limited system resources of the electronic device. According to an exemplary embodiment, the middleware 1530 (for example, the middleware 1343) may include, for example, at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The run time library 1535 may include, for example, a library module that a compiler uses in order to add new functions through a programming language while the applications 1570 are executed. The run time library 1535 may perform input/output management, memory management, or a function for an arithmetic function.

The application manager 1541, for example, may manage a lifecycle of at least one of the applications 1570. The window manager 1542 may manage a GUI resource used in a screen. The multimedia manager 1543 may detect a format required for reproducing various media files and encode or decode a media file using a codec appropriate for the corresponding format. The resource manager 1544 may manage resources, such as a source code, a memory, or a storage space, of at least one of the applications 1570.

The power manager 1545 may operate together with, for example, a Basic Input/Output System (BIOS), so as to manage a battery or power and may provide power information required for the operation of the electronic device. The database manager 1546 may generate, search for, or change a database to be used by at least one of the applications 1570. The package manager 1547 may manage the installation or the updating of applications distributed in a package file form.

For example, the connectivity manager 1548 may manage wireless connections, such as Wi-Fi or Bluetooth. The notification manager 1549 may display or notify an event such as a received message, an appointment, a proximity notification, and the like to a user without disturbance. The location manager 1550 may manage location information of the electronic device. The graphic manager 1551 may manage graphic effects to be provided to a user and user interfaces related to the graphic effects that may be operated in conjunction with a GPU. The security manager 1552 may provide various security functions required for system security or user authentication. According to an embodiment of the present disclosure, when the electronic device (for example, the electronic device 200) has a phone function, the middleware 1530 may further include a telephony manager for managing a voice or video communication function of the electronic device.

The middleware 1530 may include a middleware module for forming a combination of various functions of the aforementioned components. The middleware 1530 may provide modules specialized according to the type of OS in order to provide differentiated functions. In addition, some existing components may be dynamically removed from the middleware 1530, or new components may be added to the middleware 230.

The API 1560 (for example, the API 1354) is, for example, a set of API programming functions, and may be provided another configuration according to an operating system. For example, for each platform, one API set may be provided in a case of Android or iOS, and two or more API sets may be provided in a case of Tizen.

The application 1570 (for example, the application program 1347) may include, for example, a home 1571, a dialer 1572, an SMS/MMS 1573, an instant message (IM) 1574, a browser 1575, a camera 1576, an alarm 1577, a contact 1578, a sound dial 1579, an e-mail 1580, a calendar 1581, a media player 1582, an album 1583, a clock 1584, or at least one application that may provide health care (for example, measuring an exercise degree or blood glycose) or environmental information.

According to an embodiment, the application 1570 may include an application (hereinafter, referred to as "an information exchange application for convenience of description") that supports exchange of information between the electronic device (for example, the electronic device 200) and external electronic device (for example, the first external electronic device 1302 and the second external electronic device 1304). The information exchange application may include, for example, a notification relay application for forwarding specific information to an external electronic device, or a device management application for managing an external electronic device.

For example, the notification relay application may have a function of forwarding, to external electronic devices (for example, the electronic devices 1302 and 1304), notification information generated from other applications of the electronic device 10 (for example, an SMS/MMS application, an e-mail application, a health care application, and an environmental information application). The notification relay application may receive notification information from, for example, an external electronic device and provide the received notification information to a user.

The device management application may, for example, manage (for example, install, delete, or update) a function for at least a part of an external electronic device (for example, the electronic device 1302 or 1304) communicating with the electronic device 10 (for example, activating/deactivating the external electronic device itself (or some components thereof) or adjusting the brightness (or resolution) of a display), an application operating in the external electronic device, or a service provided from the external electronic device (for example, a telephone call service or a message service).

According to an embodiment, the application 1570 may include an application (for example, a health management application) predefined according to an attribute of an external electronic device (for example, an electronic device 1302 or 1304). According to an embodiment, the application 1570 may include an application that is received from an external electronic device (for example, the server 1306 or the external electronic device 1302 or 1304). According to an embodiment of the present disclosure, the applications 1570 may include a preloaded application or a third party application that is downloaded from a server. The names of the elements of the program module 1510 according to the illustrated embodiment may vary according to the type of the operating system.

According to various embodiments of the present disclosure, for example, through the use of an FSR sensor and optionally may include in in an opening/closing state of the cover can be determined without using a high-priced sensor, and an increase in the weights of the case and the electronic device due to use of sensors can be minimized.

Furthermore, according to various embodiments of the present disclosure, power consumption generated as the cover is opened against an intention of the user due to a plurality of sensors attached to different locations of the case can be prevented. In addition, conveniences of the user can be guaranteed by determining the states of the cover and the electronic device and performing a corresponding operation by using a plurality of sensors in various situations.

According to various embodiments, at least a part of the program module 1510 may be implemented by software, firmware, hardware, or two or more combinations thereof. At least a part of the program module 1510, for example, may be implemented (for example, executed) by a processor (for example, the processor 250). At least a part of the program module 1510 may include, for example, a module, a program routine, a set of instructions, or a process for performing at least one function.

Each of the elements described in the specification may include one or more components, and the terms of the elements may be changed according to the type of the electronic device. In various embodiments, the electronic device may include at least one of the elements described in the specification, and some elements may be omitted or additional elements may be further included. Some of the elements of the electronic device according to various embodiments may be coupled to form one entity, and may perform the same functions of the corresponding elements before they are coupled.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry, such as integrated circuitry, that is configured for operation.

Under the broadest reasonable interpretation, the appended claims constitute statutory subject matter in compliance with 35 U.S.C. §101 and none of the elements are software per se. The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. Nor are the claims directed to Abstract ideas.

At least some of the devices (for example, modules or functions) or methods (for example, operations) according to various embodiments of the present disclosure may be implemented by an instruction stored in a computer-readable storage medium, for example, in the form of a program module. When the instruction is executed by the processor (for example, the processor 250), the at least one processor may perform a function corresponding to the instruction.

The computer-readably storage medium may include a hard disk, a floppy disk, a magnetic medium (for example, a magnetic tape), an optical medium (for example, a compact disk read only memory (CD-ROM)), a digital versatile disk (DVD), a meneto-optical medium (for example, a floptical disk), a hardware device (for example, a read only memory (ROM), a random access memory (RAM), or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is applied.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added.

According to various embodiments of the present disclosure, an opening/closing state of the cover can be determined without using a high-priced sensor, and an increase in the weights of the case and the electronic device due to use of sensors can be minimized.

Furthermore, according to various embodiments of the present disclosure, power consumption generated as the cover is opened against an intention of the user due to a plurality of sensors attached to different locations of the case can be prevented. In addition, conveniences of the user can be guaranteed by determining the states of the cover and the electronic device and performing a corresponding operation by using a plurality of sensors in various situations.

Further, the embodiments disclosed in the specification are provided to describe the technical contents or for understanding of the technical contents, and the technical scope of the present disclosure is not limited thereto. Accordingly, the scope of the present disclosure should be construed to include all changes or various embodiments based on the technical spirit of the present disclosure.

What is claimed is:

1. A case for an electronic device, the case comprising:
    a coupling member detachably coupled to a part of the electronic device;
    a cover having one or more folded positions ranging between an opened state and a closed state, the cover extending from the coupling member to cover a display of the electronic device in a closed state; and
    at least one Force Sensing Resistor (FSR) sensor disposed in the cover to generate an interrupt based on a pressure applied thereto corresponding to a particular one of the folded positions;
    wherein the at least one FSR sensor comprises:
    one or more inner FSR sensors disposed on an inner surface of the cover; and
    one or more outer FSR sensors disposed on an outer surface of the cover.

2. The case of claim 1, wherein the at least one FSR sensor comprises:
    an FSR element, a resistance value of which changes as the applied pressure changes based on a change in the folded position of the cover; and
    an interrupt generating module that generates an interrupt if the resistance value of the FSR element is a predefined value or less.

3. The case of claim 1, wherein the at least one FSR sensor comprises a plurality of inner FSR sensors disposed at different locations with respect to a transverse axis of the cover.

4. The case of claim 1, wherein the cover comprises a plurality of areas configured to be foldable about a longitudinal axis of the cover, and the one or more inner FSR sensors and the one or more outer FSR sensors are disposed in each of the plurality of areas of the cover.

5. The case of claim 1, wherein the cover comprises a transparent window formed on one area of the cover.

6. An electronic device coupled to a case comprising a cover configured to cover a display, the electronic device comprising:
    a display;
    an interface that receives interrupts from one or more inner Force Sensing Resistor (FSR) sensors disposed on an inner surface of the cover and one or more outer FSR sensors disposed on an outer surface of the cover in correspondence with a position of the cover; and
    at least one processor that receives interrupts from the interface, the at least one processor configured to perform a predefined operation based on whether the interrupts of at least one of the inner FSR sensors and the outer FSR sensors are received by the interface.

7. The electronic device of claim 6, wherein in response to receiving interrupts from the inner FSR sensors without receiving any interrupts from the outer FSR sensors, the processor is further configured to display contents in an area corresponding to a transparent window of the cover.

8. The electronic device of claim 6, wherein in response to determining that no interrupt are received from any one of the inner FSR sensors and the outer FSR sensors after receiving interrupts from the inner FSR sensors without receiving any interrupts from the outer FSR sensors, the processor is further configured to display a locking screen on the display.

9. The electronic device of claim 6, wherein in response to determining that no interrupt are received from any one of the inner FSR sensors and the outer FSR sensors after receiving interrupts from the inner FSR sensors without receiving any interrupts from the outer FSR sensors, the processor is further configured to accept a reception call or execute a predefined application.

10. The electronic device of claim 6, wherein in response to determining that no interrupts are received from any one of the inner FSR sensors and the outer FSR sensors, the processor is further configured to display contents on the display longitudinally.

11. The electronic device of claim 6, wherein in response to receiving interrupts from the inner FSR sensors and from the outer FSR sensors, the processor is further configured to display contents on the display longitudinally.

12. The electronic device of claim 6, wherein in response to receiving interrupts from the outer FSR sensors without receiving any interrupts from the inner FSR sensors, the processor is further configured to display contents on the display transversely.

13. The electronic device of claim 6, wherein in response to receiving one interrupt from one of a plurality of inner FSR sensors and another interrupt from one of a plurality of outer FSR sensors, the processor is further configured to displays contents on the display transversely.

14. A method of controlling an electronic device coupled to a case comprising a cover configured to cover a display, the method comprising:
    determining whether interrupts from one or more inner Force Sensing Resistor (FSR) sensors disposed on an inner surface of the cover and one or more outer FSR sensors disposed on an outer surface of the cover are received; and
    performing a predefined operation based on whether the interrupts from the inner FSR sensors and the outer FSR sensors are received.

15. The method of claim 14, wherein the performing of the predefined operation comprises, in response to receiving interrupts from the inner FSR sensors without receiving any interrupts from the outer FSR sensors, displaying contents in an area corresponding to a transparent window of the cover.

16. The method of claim 14, wherein the performing of the predefined operation comprises, in response to determining that no interrupt are received from any one of the inner FSR sensors and the outer FSR sensors after receiving interrupts from the inner FSR sensors without receiving any interrupts from the outer FSR sensors, performing at least one of an operation of displaying a locking screen, an operation of accepting a reception call, or an operation of executing a predefined application.

17. The method of claim 14, wherein the performing of the predefined operation comprises, in response to determining that no interrupts are received from any one of the inner FSR sensors and the outer FSR sensors, displaying contents on the display longitudinally.

18. The method of claim 14, wherein the performing of the predefined operation comprises, in response to receiving interrupts from the inner FSR sensors and from the outer FSR sensors, displaying contents on the display longitudinally.

19. The method of claim 14, wherein the performing of the predefined operation comprises, in response to receiving interrupts from the outer FSR sensors without receiving any interrupts from the inner FSR sensors, displaying contents on the display transversely.

20. The method of claim 14, wherein the performing of the predefined operation comprises, in response to receiving one interrupt from one of a plurality of inner FSR sensors and another interrupts from one of a plurality of outer FSR sensors, displaying contents on the display transversely.

* * * * *